US011860091B2

(12) United States Patent
Kavosh et al.

(10) Patent No.: US 11,860,091 B2
(45) Date of Patent: Jan. 2, 2024

(54) APPARATUS AND METHOD FOR IN-SITU OPTICAL INSPECTION OF LASER-INDUCED SURFACE MODIFICATIONS AND LASER PROCESS CONTROL

(71) Applicants: Iraj Kavosh, San Jose, CA (US); Raya Kavosh, San Jose, CA (US)

(72) Inventors: Iraj Kavosh, San Jose, CA (US); Raya Kavosh, San Jose, CA (US)

( * ) Notice: Subject to any disclaimer, the term of this patent is extended or adjusted under 35 U.S.C. 154(b) by 359 days.

(21) Appl. No.: 17/189,221

(22) Filed: Mar. 1, 2021

(65) Prior Publication Data

US 2022/0163445 A1 May 26, 2022

Related U.S. Application Data

(60) Provisional application No. 62/956,241, filed on Jan. 1, 2020.

(51) Int. Cl.

| | |
|---|---|
| ***G01J 3/44*** | (2006.01) |
| ***G01N 21/47*** | (2006.01) |
| *G01N 21/88* | (2006.01) |
| *G01N 21/65* | (2006.01) |
| *G01J 3/26* | (2006.01) |

(52) U.S. Cl.

CPC ............ *G01N 21/4738* (2013.01); *G01J 3/26* (2013.01); *G01N 21/65* (2013.01); *G01N 2021/8867* (2013.01)

(58) Field of Classification Search

CPC ....... G01N 21/4738; G01N 2021/8867; G01N 21/65; G01N 21/64; G01N 21/718; G01N 21/8806; G01N 21/94; G01N 2021/4709; G01N 2021/646; B23K 26/032; B23K 26/16; B23K 26/352; B23K 31/12; B23K 26/0622; G01J 3/44; G01J 3/26

See application file for complete search history.

(56) References Cited

U.S. PATENT DOCUMENTS

2005/0036136 A1* 2/2005 Opsal ................ G01N 21/9505 356/237.2
2006/0215175 A1* 9/2006 Yacoubian ......... G01N 21/9505 356/502
2013/0321798 A1* 12/2013 Urano ................ G01N 21/4795 356/237.5

* cited by examiner

*Primary Examiner* — Abdullahi Nur

(74) *Attorney, Agent, or Firm* — Edmond DeFrank

(57) ABSTRACT

The embodiments disclose a method for in-situ inspection and processing of an object including providing a pulsed laser source during the in-situ inspection of a surface of the object for modifying at least one of an optical, mechanical, or chemical property of a first region of the surface, directing the laser source through an optics path to shape, position and focus a pulsed laser beam at the first region, directing a probe illumination light beam to the optics path to produce a combined and collinear optical light path of the probe illumination light beam and the pulsed laser beam to focus and deliver the combined and collinear optical light path at a same region on the surface, superimposing a first focus spot of the probe illumination light beam over a second focus spot of the pulsed laser beam on an illuminated region of the surface.

20 Claims, 36 Drawing Sheets

APPARATUS AND METHOD FOR IN-SITU OPTICAL INSPECTION OF LASER-INDUCED SURFACE MODIFICATIONS AND LASER PROCESS CONTROL

CROSS-REFERENCED TO RELATED APPLICATIONS

This application is based on U.S. Provisional Patent Application Ser. No. 62/956,241 filed Jan. 1, 2020, entitled "APPARATUS AND METHOD FOR IN-SITU OPTICAL INSPECTION OF LASER-INDUCED SURFACE MODIFICATIONS AND LASER PROCESS CONTROL", by IRAJ KAVOSH.

BACKGROUND

Measuring the condition of a smooth flat surface has increased in use as technologies have progressed in fields of miniaturization for example nano technology. Metrology is a field of measurement that includes measuring the condition of a smooth flat surface. Light scatterometry is a method for making the measurements of a surface by analyzing the angles (and/or intensity) of refracted light projected on the surface. These techniques are used for inspection purposes.

DETAILED DESCRIPTION OF THE INVENTION

Figure 1:
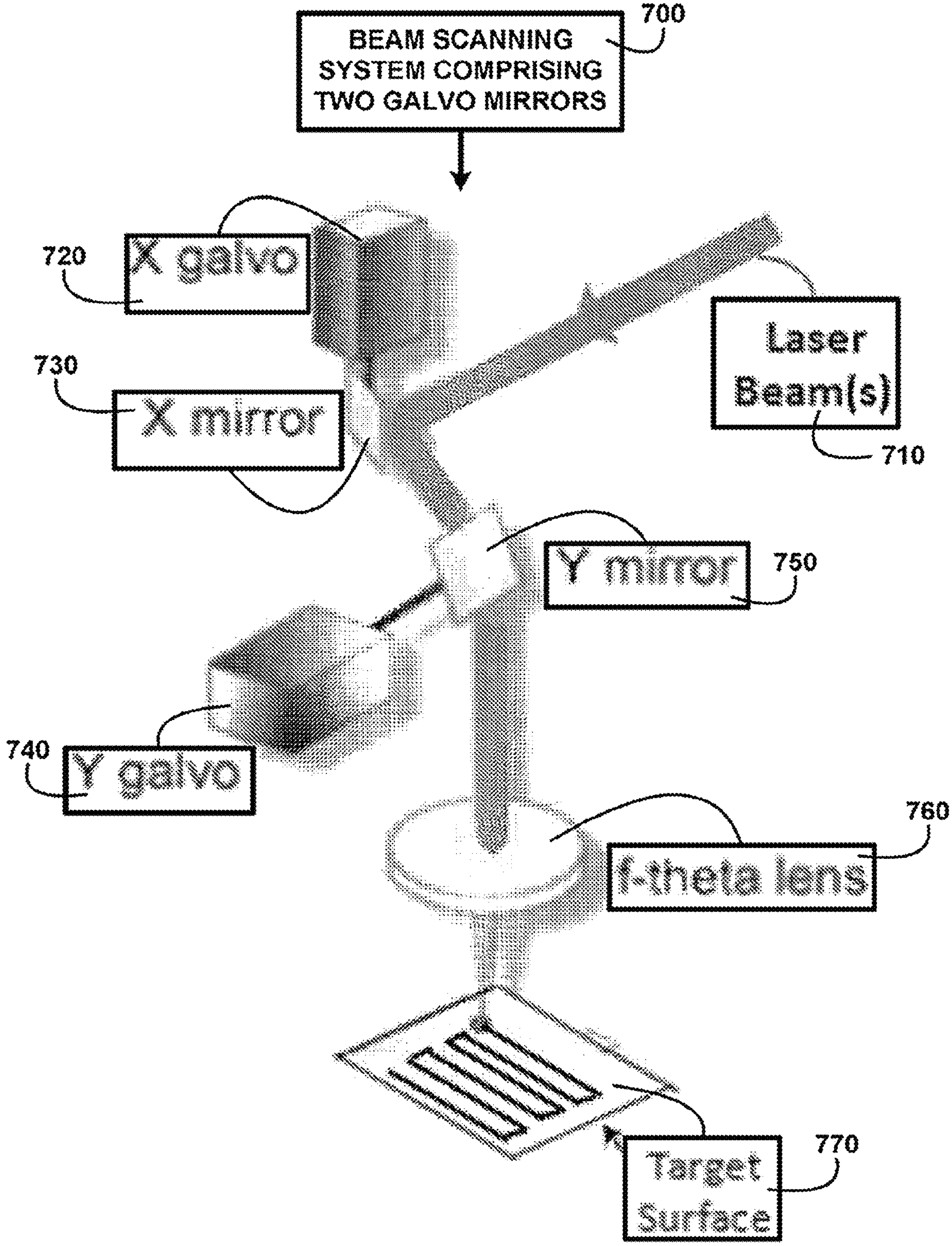
FIG. 1 shows for illustrative purposes only an example of a beam scanning system comprising two galvo mirrors of one embodiment.

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview

It should be noted that the descriptions that follow, for example, in terms of an apparatus and method for in-situ optical inspection of laser-induced surface modifications and laser process control is described for illustrative purposes and the underlying system can apply to any number and multiple types surface inspections and modifications. In one embodiment of the present invention, the apparatus and method for in-situ optical inspection of laser-induced surface modifications and laser process control can be configured using at least one light source. The apparatus and method for in-situ optical inspection of laser-induced surface modifications and laser process control can be configured to include at least one mirror device and can be configured to include at least one Process laser beam and one Probe beam using the present invention.

The embodiments are directed toward optical inspection of laser-induced surface modifications such as surface micro and nano-roughness, surface cleaning and coating removal, surface micro and nano patterning, surface micro and nano structuring, and surface chemistry based on the analysis of scattered probe light reflected off the laser-modified surface. In particular, this invention relates to combining an optical inspection system and a laser processing system into one integrated tool enabling laser surface modification process, in-situ monitoring of the laser-induced surface changes, and real-time control of the laser process vital parameters.

The apparatus and method for in-situ optical inspection of laser-induced surface modifications and laser process control includes two optical techniques of Laser Surface Modification and Treatment Process, and Light Scatterometry-based Metrology are combined to enable in-situ inspection of a laser-treated surface and in-situ control of the laser process. A bi-directional common optics path, or a portion of it, is utilized to deliver both Process beam (to induce a desired surface modification) and Probe beam (to examine surface conditions) onto a target surface and to collect and transport probe light beams reflected (or emitted) from the surface back to the apparatus for measurement and analysis.

The embodiments describe two optical techniques of Laser Surface Modification and Treatment Process, and Light Scatterometry-based Metrology is combined to enable in-situ inspection of a laser-treated surface and in-situ control of the laser process. A bi-directional common optics path, or a portion of it, is utilized to deliver both Process beam (to induce a desired surface modification) and Probe beam (to examine surface conditions) onto a target surface and to collect and transport probe light beams reflected (or emitted) from the surface back to the apparatus for measurement and analysis.

Light scatterometry is a nondestructive technique for inspection and analysis of surface conditions such as surface roughness, surface texture and microstructure, surface contaminants and defects, and surface coating materials.

A laser beam can accurately deliver appropriate radiation intensity at a precise position on a target surface where it is needed to achieve a desired surface change.

The apparatus and method for in-situ optical inspection of laser-induced surface modifications and laser process control combines light scatterometry and laser surface processing, e.g., ablation of a target surface. Laser surface modification processes span across a wide spectrum of applications and are performed to achieve an optimized surface condition or performance for a given application.

Some examples of surface modification processes using pulse lasers include laser cleaning when particulate, molecular contaminants, or stain materials can be removed by a pulse UV laser to improve surface cleanliness, e.g., applications in hard disk drive, HDD, and semiconductor industries to clean disks and wafers. Laser surface texturing to achieve a desired surface micro or nano roughness, e.g., disk laser texturing process to produce surface bumps to reduce slide-disk friction in hard disk drive assembly, or selectively ablating surface materials to define a desired surface texture structure and selectively ablating materials to define a desired surface texture roughness and enhance surface optical properties, e.g., minimize undesired surface reflectivity. Laser surface ablation process for surface cleaning, e.g., rust or oil removal, surface coating removal, e.g, surface decorating where coating materials (e.g., paint, or organic coating materials) are removed entirely from a surface to expose the surface under-layer or the substrate for surface rework. Surface decorating where coating materials (e.g., paint, or organic coating materials) are removed partially, e.g., removing a damaged top layer, to rework a damaged area. Surface materials are selectively ablated and removed at desired locations for surface patterning, e.g, nano and micro structuring, and generating surface pits, micro-holes, and grooves in a pattern. Laser surface heat treatment to alter surface chemistry and composition. Some other examples of laser applications in surface modification and surface engineering include, but are not limited to, laser-induced enhanced mechanical properties (e.g., increasing surface hardness, or reduction in friction and wear), applications in altering surface chemistry (e.g., laser carbonizing).

A laser surface modification process can alter optical properties of a target surface and instigate changes in surface light scattering, reflectivity, and absorption behavior at specific (laser) light wavelength(s). These laser-induced changes lend scatterometry-based optical inspection a suitable technique for inspecting laser-treated surfaces and evaluation of laser-induced surface change. For example, Laser surface ablation can alter surface color and/or surface roughness. Changes in surface color and surface roughness can induce changes in a surface reflectivity and scattering characteristic of light at specific wavelength(s). An appropriately selected light beam can be used as a probe to analyze the changes in surface optical response to the probe light beam, and to evaluate and assess the condition of laser-treated regions on the surface.

The term "Galvo" as used herein refers to a Galvanometer, an electromechanical instrument that deflects a light beam by using a mirror, meaning that it has sensed an electric current with characteristics of operating at fast speeds and detecting intricate fine detailed markings.

In FIGS. 5-29 the reference numbers follow the following: Drawing reference numbers 100 to 199 refers to an OSI Assembly. Drawing reference numbers 200 to 299 refer to a Process Laser System. Drawing reference numbers 300 to 399 refer to a System Control Unit. Drawing reference numbers 400 to 499 refer illustrations of appropriate optics to direct combined probe and process laser beams to COA, optics, e.g., a reflective mirror 400. Drawing reference numbers 500 to 599 refer to a Control Optics Assembly (COA). Drawing reference numbers 600 to 699 refer to illustrations of a Positioning Stage Assembly 604 of one embodiment.

Embodiments of the present invention include an apparatus and method that combines a scatterometry-based optical inspection system and a laser surface processing system (more specifically, a pulse laser) into one integrated tool to permit in-situ inspection of a target surface under laser modification process. The embodiments provide real-time (in-situ) control of laser pulse intensity at the surface. The apparatus and method provide the capability to exploit laser-induced changes in the surface optical response to a probe light beam (e.g., a laser probe beam) of a specific wavelength, i.e., how the light reflected and scattered from the surface at the specific wavelength deviates after the laser surface modification.

Specifically, this apparatus and method provide a bi-directional common optics path, or a portion of it, for process and probe beams by combining and directing col-linear process pulse laser and probe laser (i.e., illumination light) beams along a common optic path. Positioning, and focusing both process and probe laser beams at a region on of a target surface by shared common focusing optics so that the position of focus spots of the probe and process laser beams a the region are substantially superimposed. Shine probe illumination beam onto a region. Collecting back-scattered light reflected off the region through the same shared focusing optics, and directing it back along the common optics path, or a portion of it, into the apparatus. Sampling, measuring, and analyzing the arriving back-scattered probe light intensity either just before the start of a process laser pulse, or just after the completion of the process laser pulse, to determine the surface condition of the region. Utilizing system control logic for in-situ muting or adjusting the intensity of the ensuing laser pulse based on the analysis and assessment of the surface condition of the region, thereby providing in-situ control of laser surface modification process.

Sampling and measuring the probe light beam is temporally separated from the process laser pulse. The detection and analysis of the scattered light can be executed immediately following completion of the process laser pulse at a first region. Such in-situ post-process analysis provides a means for in-situ evaluation of the laser-modified region and effectiveness of the laser modification process at the region after delivery of the pulse energy, i.e., post-laser-treatment in-situ inspection. Post-laser-treatment in-situ inspection, in turn, can be utilized by the apparatus control logic for real-time control of the surface treatment process by adjusting the energy of the ensuing laser pulse at the next region, and/or to map the untreated or under-treated regions of the workpiece for a rework run. This methodology is more suited for a fresh, un-treated surface.

Additionally, or alternatively, the in-situ detection and analysis of the back-scattered light reflected off of a probed region can be executed just before the delivery of a process laser pulse to the region, i.e., pre-laser-treatment in-situ inspection. The analysis of pre-laser-treatment surface conditions, in turn, is utilized by the apparatus control logic to control the laser process by adjusting or muting the energy of the ensuing laser pulse(s) delivered at the region to induce a desired surface modification.

FIG. 1 shows for illustrative purposes only an example of a beam scanning system comprising two galvo mirrors of one embodiment. FIG. 1 shows a beam scanning system comprising two galvo mirrors for scanning an area in XY direction. A galvo system 1040 includes a laser beams 710, an X galvo 720, X mirror 730, Y galvo 740, Y mirror 750, f-theta lens 760 and target surface 770.

The beam scanning system comprising two galvo mirrors is one embodiment of a method for laser surface modification process combining a pulsed laser modification process, in-situ surface inspection of the laser-treated surface, and in-situ laser pulse intensity adjustment to control laser surface modification process. the method comprising the steps of:

The beam scanning system is providing a pulsed process laser source to induce an intended modification in a surface material's optical and/or mechanical, and/or chemical, and/or physical properties, and/or surface topography, wherein the induced surface changes alter the region's light-scattering and/or reflectivity response to a probe illumination light beam; directing said process laser beam through an optics path to shape, position, and focus it at a region on the surface. The beam scanning system is directing a single, or multiple, process laser pulse at a pre-set pulse intensity to induce surface modification at a first region on the surface. The beam scanning system is providing a probe illumination light beam; directing it to the optics path of said pulse laser beam to combine and collinear the optical paths of the probe beam and the pulse laser beam, directing the probe beam through the common optics path to focus and deliver it at the same region on the target surface utilizing the common optics of a Control Optics Assembly, whereby superimposing the position of focus spot of the probe illumination laser beam over the focus spot of the process laser beam on the surface and collecting back-scattered probe light reflected off the illuminated region, the first region impinged by the illuminating probe beam, by the same delivery focusing optics of the Control Optics Assembly. The beam scanning system is directing the collected light from the illuminated region through said common optics path, or a portion of it, thereby providing a bi-directional common optic path, or a portion of it, for the source process laser beam, probe illumination light beam, and the collected back-scattered probe light arriving from the illuminated region and separating the collected probe light beam, or a portion of it, and directing it toward a Photo-detector sub-assembly. The beam scanning system is sampling and measuring power of the probe light received by said Photo-detector, after the process laser pulse(s) is completed and analyzing the measured power and comparing the measurement value with predetermined reference values, corresponding to an interrogated region, to assess surface condition of the laser-treated region in achieving the intended laser-induced surface changes. The beam scanning system is moving the target workpiece to position the next region of the surface under the impinging process and probe laser beams and adjusting laser pulse intensity for the ensuing laser pulse via system control logic and laser controller to achieve intended surface modification at the next region of one embodiment.

DETAILED DESCRIPTION

Figure 2:
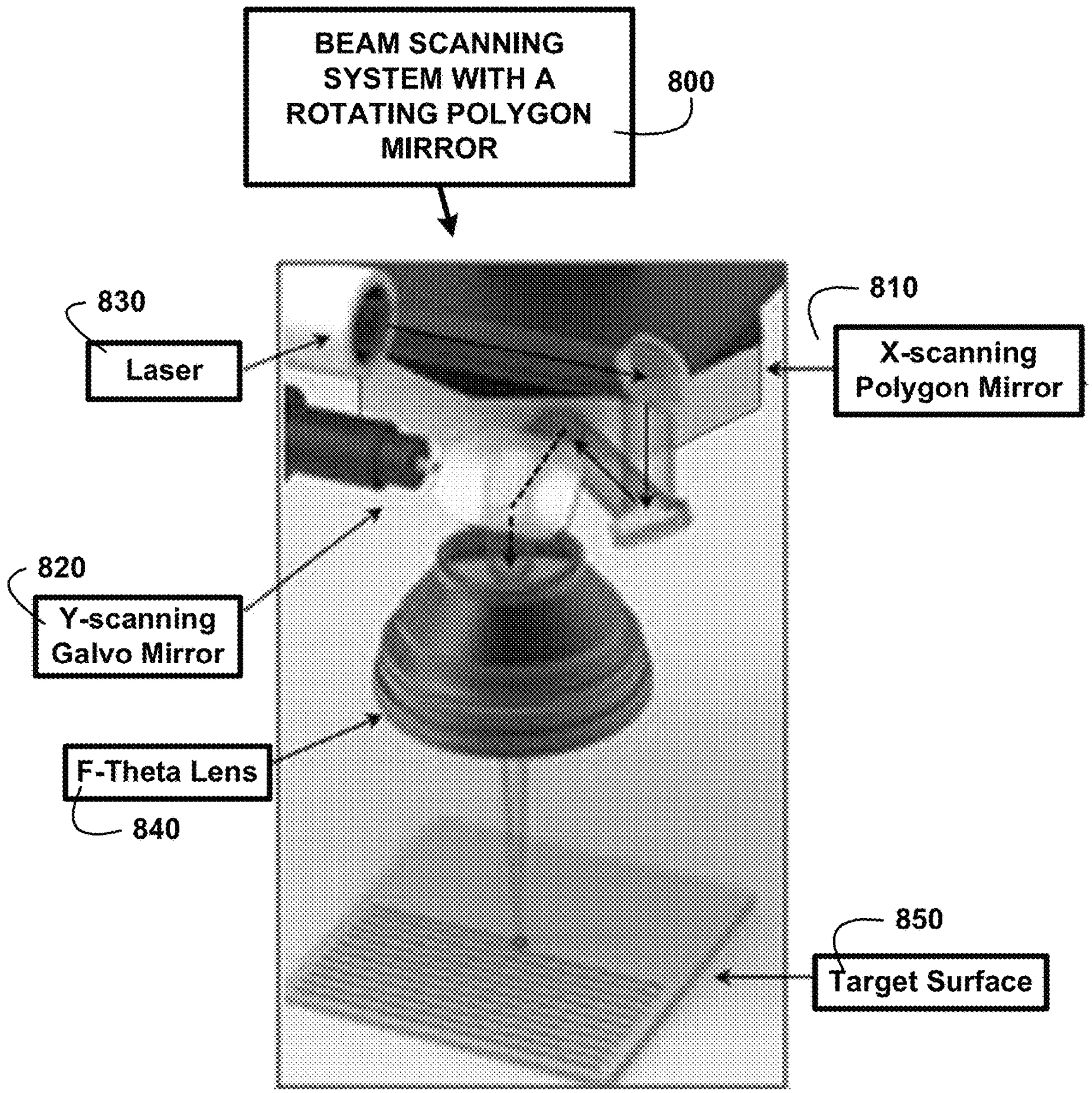
FIG. 2 shows for illustrative purposes only an example of a beam scanning system with a rotating polygon mirror of one embodiment.

FIG. 2 shows for illustrative purposes only an example of a beam scanning system with a rotating polygon mirror of one embodiment. FIG. 2 shows a beam scanning system with a rotating polygon mirror 800, a single-axis galvo mirror, and a F-Theta Lens 840. The single-axis galvo mirror in this embodiment is a Y-scanning Galvo Mirror 820. The rotating polygon mirror in this embodiment is an X-scanning Polygon Mirror 810. The beam scanning system with a rotating polygon mirror 800 includes in this embodiment a laser 830 for projecting a beam to and from a Target Surface 850 using the X-scanning Polygon Mirror 810, Y-scanning Galvo Mirror 820 and F-Theta Lens 840.

The beam scanning system with a rotating polygon mirror is another embodiment of the beam scanning system. The beam scanning system is providing sampling, measuring, and analyzing power of the collected back-scattered probe light reflected off of a laser-treated region, or fluorescence light emitted from a region, is temporally synchronized with the process laser pulse and temporally separated from the process laser pulse and executed after a process laser pulse, or multiple of pulses, impinging the surface region is completed to perform in-situ post-laser-modification inspection of the region and adjusting laser pulse intensity at the next region if the intended modification at the previous region was not achieved.

The beam scanning system comprises assemblies, subsystems, and components to enable laser surface modification on a workpiece surface by delivering pulsed laser energy at the workpiece surface and induce a desired modification at a region impinged by the laser beam, in-situ inspection of the region surface conditions by delivering a probe light beam at a laser-treated region before and/or after laser-induced modification, in-situ analyzing the region's condition, and real-time adjusting intensity of the ensuing laser pulses for controlling the surface modification process for a desired outcome. The beam scanning system is providing a process laser source to provide laser radiation beam source for modification of a target surface, wherein the target surface material is absorptive of said laser beam energy. The beam scanning system further comprises at least one Optical Surface Inspection, OSI, assembly, the assembly comprising a probe illumination light beam source for illuminating a region on said surface and a combining dichroic mirror to combine said process laser and probe light beams. A Photo-detector sub-assembly for sampling and measuring collected back-scattered light reflected from said region as a result of illuminating the region. Also included is an Optical Reflector Component comprising a thru-hole opening. The functions of the Optical Reflector Component comprise allowing the outgoing probe illumination beam(s), preferably with diameter smaller than the diameter of said opening, to pass through the opening, and to travel toward said combining mirror, separating a portion of the collected back-scattered probe light beam(s), that is reflected off a region on the target surface and transported back inside said OSI, reflecting and directing said portion of the back-scattered probe light beam(s) toward said Photo-detector sub-assembly in the OSI, preventing, or minimizing, specularly-reflected probe light reflected from the target surface from entering Photo-detector by allowing the specularly-reflected probe light mainly transmit through the Reflector Component opening and Positioning Motion Stage Assembly for controlling, positioning, and tracking the position of the process and probe beams on the target surface of one embodiment.

Figure 3:
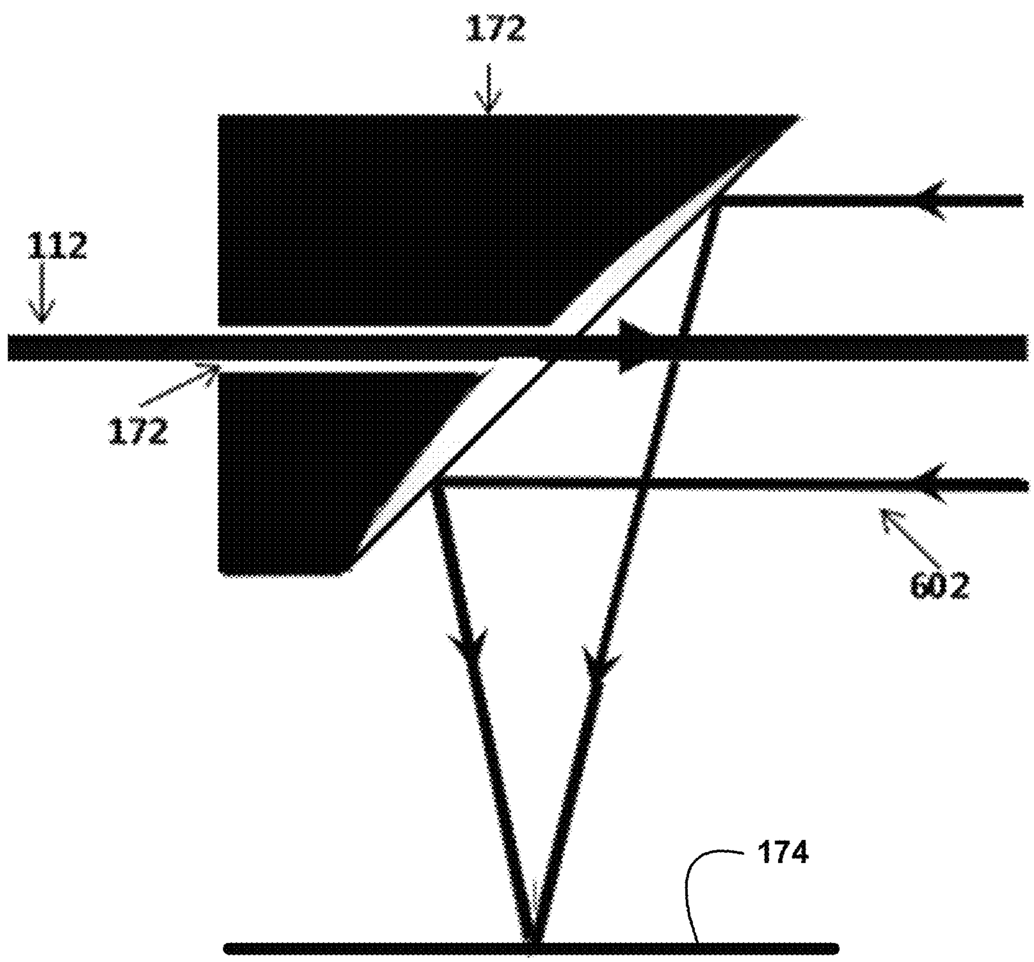
FIG. 3 shows for illustrative purposes only an example of an Optical Reflective Component (with a thru-hole opening) of one embodiment.

FIG. 3 shows for illustrative purposes only an example of an Optical Reflective Component of one embodiment. FIG. 3 shows Optical Reflective Component 170 (of an alternative geometry) with a pass-through-opening 172 that allows source probe beam 112 to pass through the component, and reflective surface 174 reflects the incoming back-scattered probe light reflected off from the target surface target sample 602 of one embodiment.

Figure 4A:
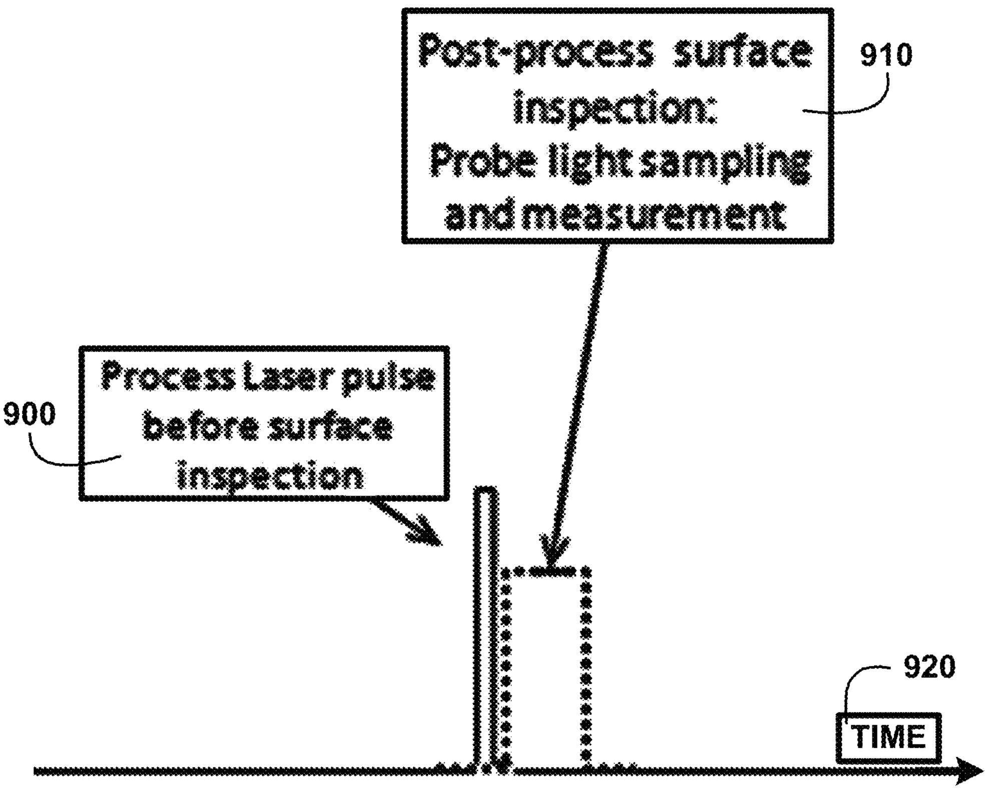
FIG. 4A shows for illustrative purposes only an example of a temporal separation of probe beam sampling of one embodiment.

FIG. 4A shows for illustrative purposes only an example of a temporal separation of probe beam sampling of one embodiment. FIG. 4A shows a temporal separation of probe beam sampling (dotted signal) for inspection and process laser pulse. A process laser pulse before surface inspection 900 and a post-process surface inspection: probe light sampling and measurement 910 can be performed over a predetermined time 920. Probe beam sampling and measurement can be executed before process pulse (pre-process inspection), or after process pulse (post-process inspection), or both before and after laser process pulse impinges a region. The apparatus further comprises a muted or removed process laser power utilized for inspecting a surface and analyzing the surface specific conditions of one embodiment.

Figure 4B:
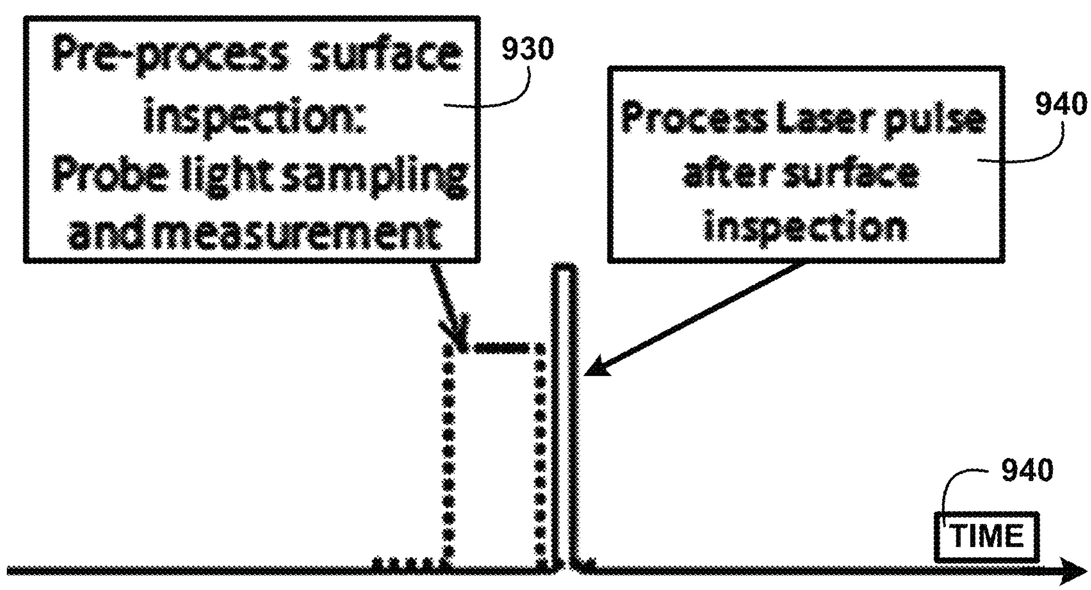
FIG. 4B shows for illustrative purposes only an example of a temporal separation of probe beam sampling of one embodiment.

FIG. 4B shows for illustrative purposes only an example of a temporal separation of probe beam sampling of one embodiment. FIG. 4B shows a pre-process surface inspection: probe light sampling and measurement 930 and a process laser pulse after surface inspection 940 over a predetermined time 920.

The apparatus provides at least one device for extracting and evacuating by-products of laser surface modification process including particles, contaminants, paint dust, and gases produced in laser surface cleaning and laser surface paint and coating removal of one embodiment.

Figure 5:
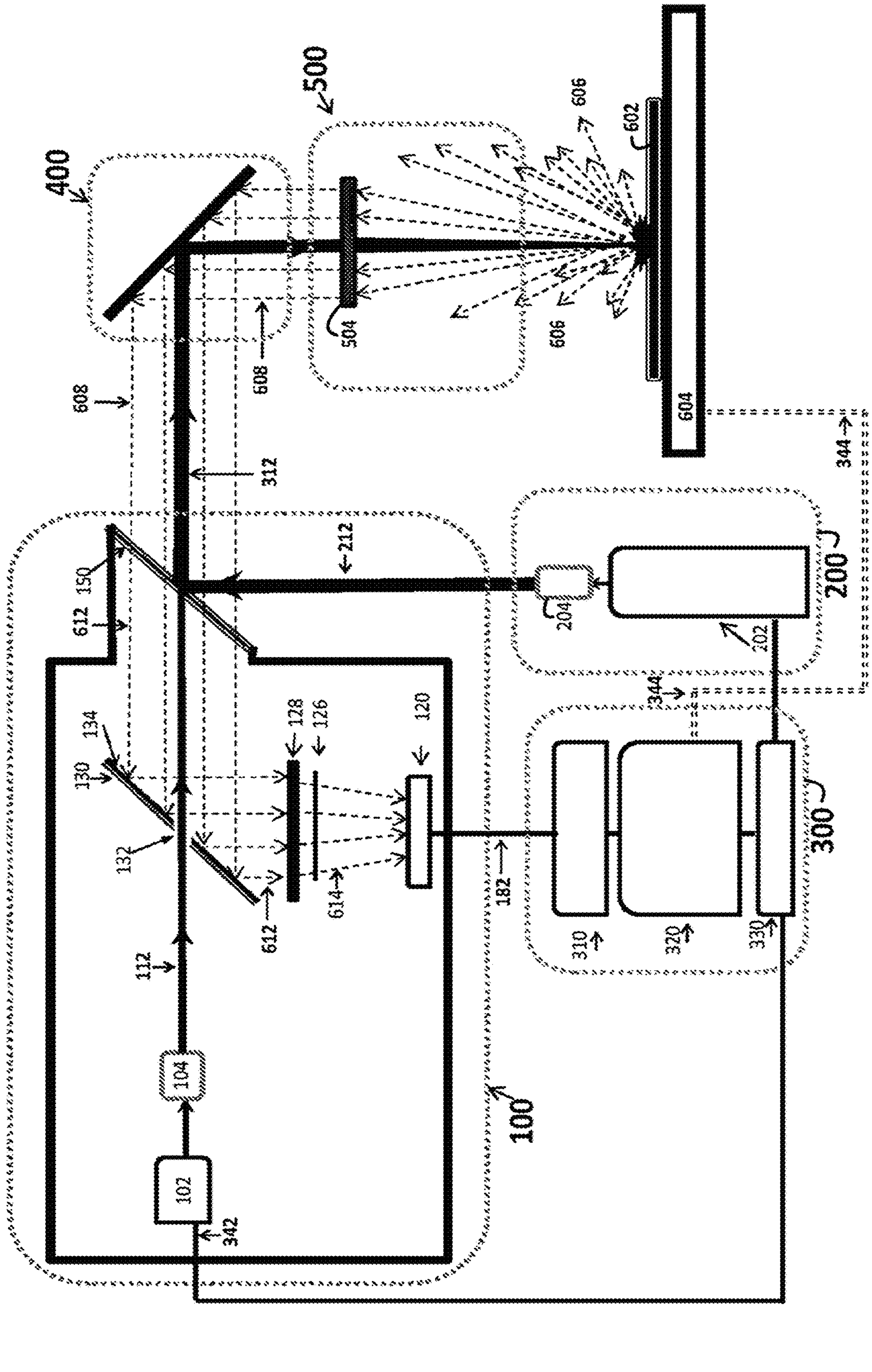
FIG. 5 shows for illustrative purposes only an example of an integrated apparatus of one embodiment.

Integrated Apparatus:

FIG. 5 shows for illustrative purposes only an example of an integrated apparatus of one embodiment. FIG. 5 shows an integrated apparatus comprising a group of systems, units and assemblies. The integrated apparatus includes an Optical Surface Inspection (OSI) system 100. The Optical Surface Inspection (OSI) system 100 includes a probe laser-A 102 that emits probe beam 112 at wavelength $\gamma_r$, and beam adjusting optics 104 to facilitate producing a desired spot size at the target surface by focusing lens 504 a component of a control optics assembly, COA, 500.

The Optical Surface Inspection (OSI) system 100 includes an Optical Reflector Component 130 comprising a surface with high-reflectivity 134 and a thru-hole opening 132, to allow the source probe beam 112 to pass through the mirror, placed in the path of the probe beam 112. Further, the surface of high reflectivity 134 separates a portion of back-scattered probe light beam(s) 612, reflected off of the target surface, and directs it toward the Photo-detector (e.g., a Silicon Photodiode) 120.

The Optical Surface Inspection (OSI) system 100 includes a dichroic combiner mirror 150 that highly reflects process beam and transmits probe beam(s), and is appropriately positioned and oriented to combine and collinear process beam 212 and probe beam 112, and direct the combined beams 312 toward a turning mirror 400.

The Optical Surface Inspection (OSI) system 100 includes a Photo-detector subassembly comprising a Photo-detector 120 which detects probe light power and sends probe power signal to the signal analyzer unit 310, and appropriate optical components, e.g., optical filters 126 to transmit probe light of a wavelength of interest, and condensing lens 128.

The Optical Surface Inspection (OSI) system 100 includes a Process Laser system 200, as energy source for modifying the surface of a target, comprising one process laser beam source 202 that emit process laser beam 212, and directs it toward beam adjusting optics 204 and dichroic mirror 150.

The Optical Surface Inspection (OSI) system 100 includes an Apparatus Control Unit 300 comprising signal analyzer 310, system control logic and electronics 320, and laser and system control software 330. The Optical Surface Inspection (OSI) system 100 includes a Turning Optics 400 comprising appropriate optical components to direct probe and process beams to Control Optics Assembly 500. The Optical Surface Inspection (OSI) system 100 includes a Control Optics Assembly 500 comprising at least a focusing lens 504. The Optical Surface Inspection (OSI) system 100 includes a Positioning Stage Assembly comprising translation stage system 604, and mounting mechanism to hold the target sample 602 of one embodiment.

A bi-directional common optics path, or a portion of it, is utilized to deliver both Process beam (to induce a desired surface modification) and Probe beam (to examine surface conditions) onto a target surface and to collect and transport probe light beams reflected (or emitted) from the surface back to the apparatus for measurement and analysis.

The intensity distribution profile of the focal spot of the process laser beam or of the probe light is a flat-top profile, or Gaussian profile, or multi-mode or super-Gaussian profile. The focus spot is circular, or semi-circular, shape, or a square shape; or a rectangular shape spot of desired aspect ratio.

The COA comprises appropriate achromatic optics, e.g., Telecentric, F-Theta, or simple focusing lens, whereby achromaticity requirements of the COA are realized to achieve desired superimpositioning of the focal spots of probe and process laser beams on a target surface. The COA is moving the workpiece to position next surface region under the superimposed focal spots of the process pulse laser and probe light beams. The COA comprises at least one beam scanning mechanism and focusing optics to illuminate a target surface region by region by scanning the superimposed focal spots of the probe and process beams on the target surface area, controlling, positioning, and tracking the position of the superimposed focal spots of the probe illumination light and process laser beams on the target surface region by region, wherein, the position and motion of the beams on the target is controlled and tracked by the System Control Unit.

The Control Optics Assembly, COA, further comprises beam shaping and focusing optics to shape and focus the process laser and probe beams to focal spots of desired shape and sizes on the target surface. The beam shaping optics comprise refractive optics; or diffractive optics, e.g., two cylindrical lenses of different focal lengths. The Control Optics Assembly, COA, comprises optical means to shape, focus, and superimpose the focal spots of the probe and the process beams onto a region on the target surface continuously by a beam scanning mechanism. The beam scanning mechanism comprises a beam scanning device and focusing optics to illuminate a target surface region by region by scanning the superimposed focal spots of the probe and process beams on the target surface, controlling, positioning, and tracking the position of the focal spots of the superimposed probe illumination light and process laser beams on the target surface region by region, wherein a region overlaps the previous region(s) and/or the subsequent region(s), and further wherein the scanning device comprises XY scanning galvanometric optics, or combined 1D-linear translation and rotating polygon mirror, or combined scanning galvo mirror and rotating polygon mirror of one embodiment.

Figure 6:
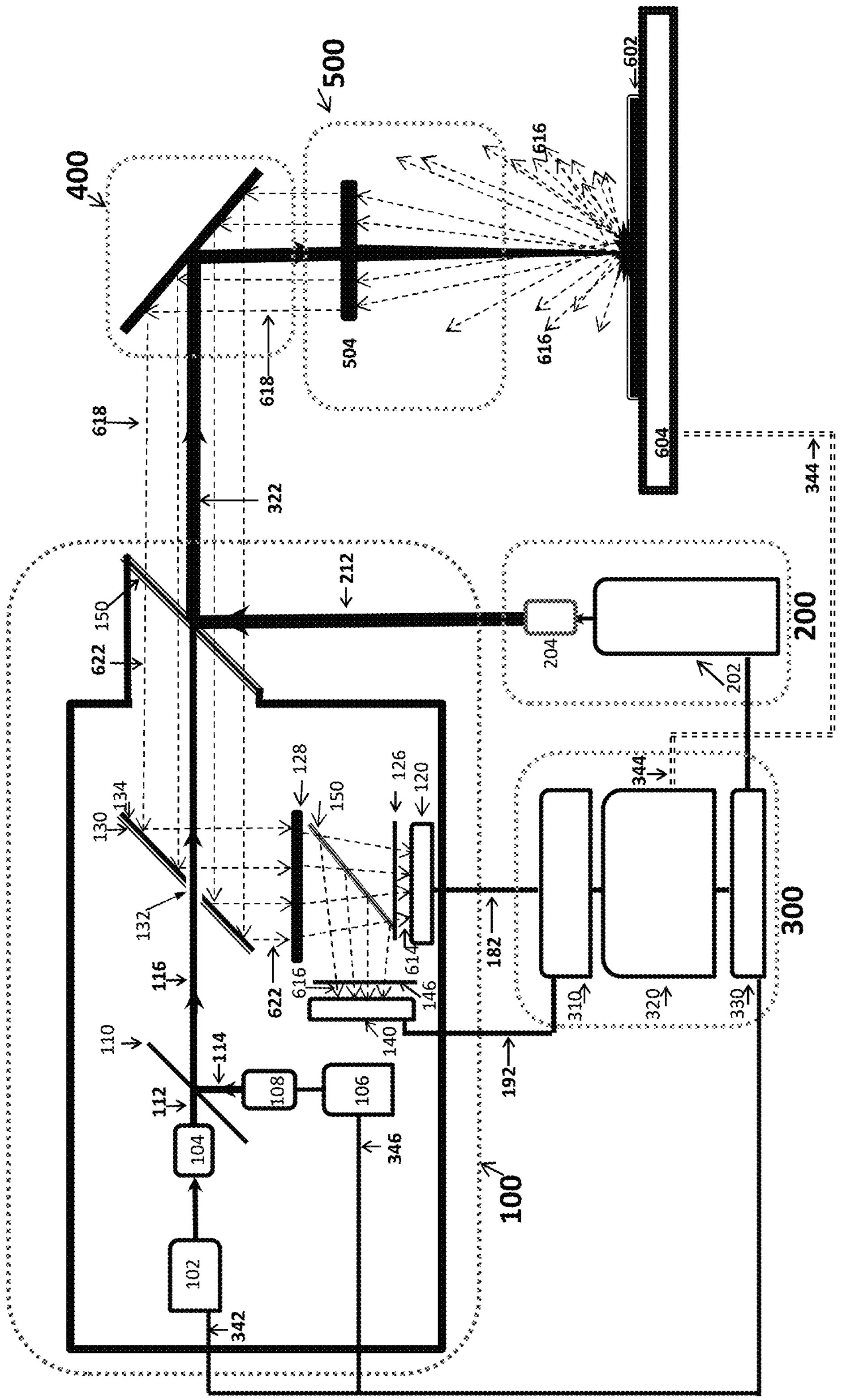
FIG. 6 shows for illustrative purposes only an example of additional integrated apparatus components of one embodiment.

FIG. 6 shows for illustrative purposes only an example of additional integrated apparatus components of one embodiment. FIG. 6 shows additional integrated apparatus components including probe laser-B source 106 that emits probe laser beam 114, beam adjusting optics 108, and a dichroic mirror 110, to combine and collinear probe beams 112 and 114, and direct the combined probe beams 116, toward the thru-hole in the Optical Reflector Component 130. FIG. 2 also shows a Photo-detector 140, optical filter 146, and a dichroic mirror 150. Dichroic mirror 150 splits the returned probe beams 622 based on its constituent wavelengths to reach Photo-detectors 120 and 140 of one embodiment.

Figure 7:
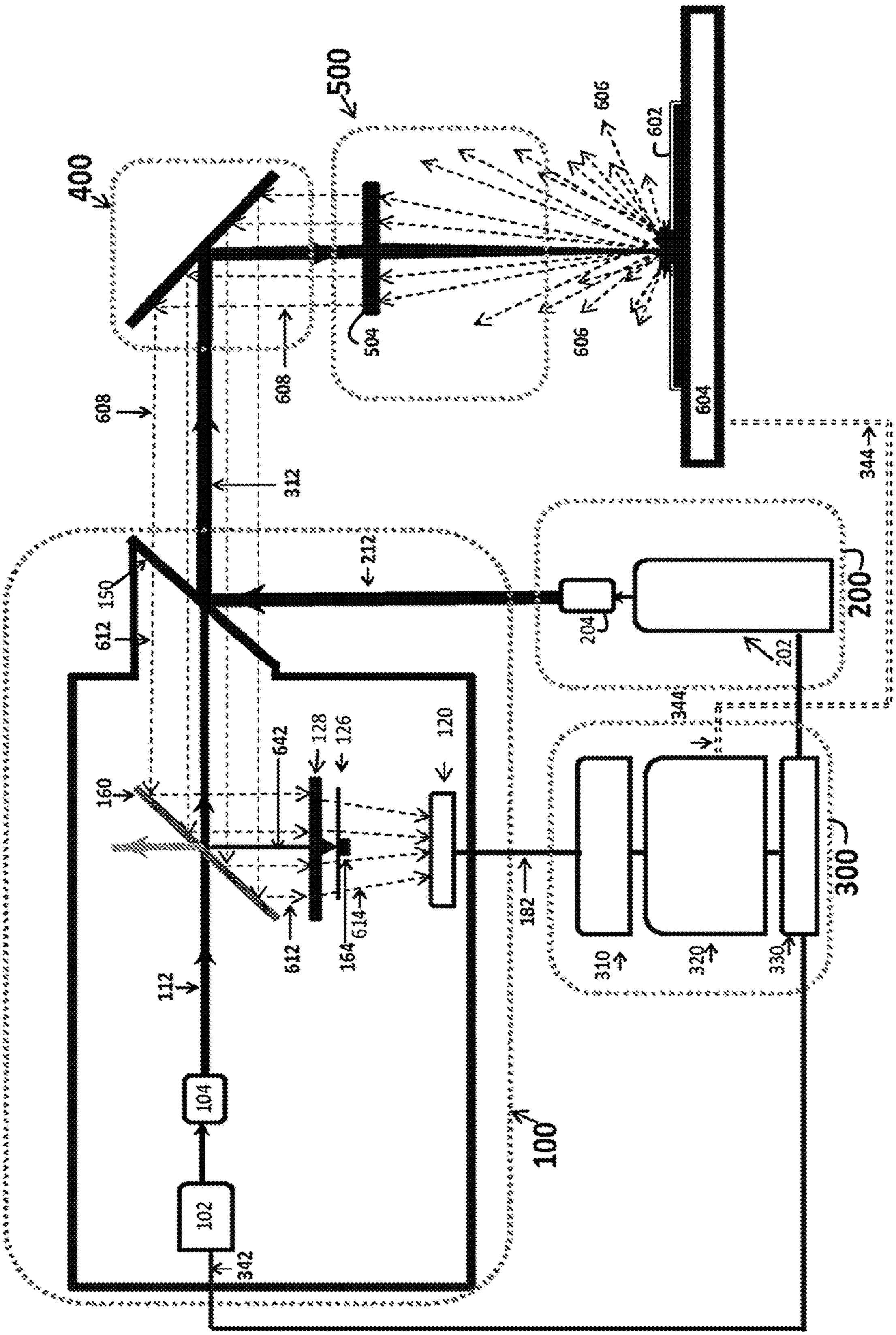
FIG. 7 shows for illustrative purposes only an example of beam splitting and blocking components of one embodiment.

FIG. 7 shows for illustrative purposes only an example of beam splitting and blocking components of one embodiment. FIG. 7 shows a beam splitting optic 160 that partially transmits the outgoing probe beam(s), and reflects part of the returned scattered probe light, reflected off of the target surface. Additionally FIG. 7 shows a light-blocking component 164 that blocks and prevents the specularly-reflected probe beam 642 from reaching the Photo-detector 120 of one embodiment.

Figure 8A:
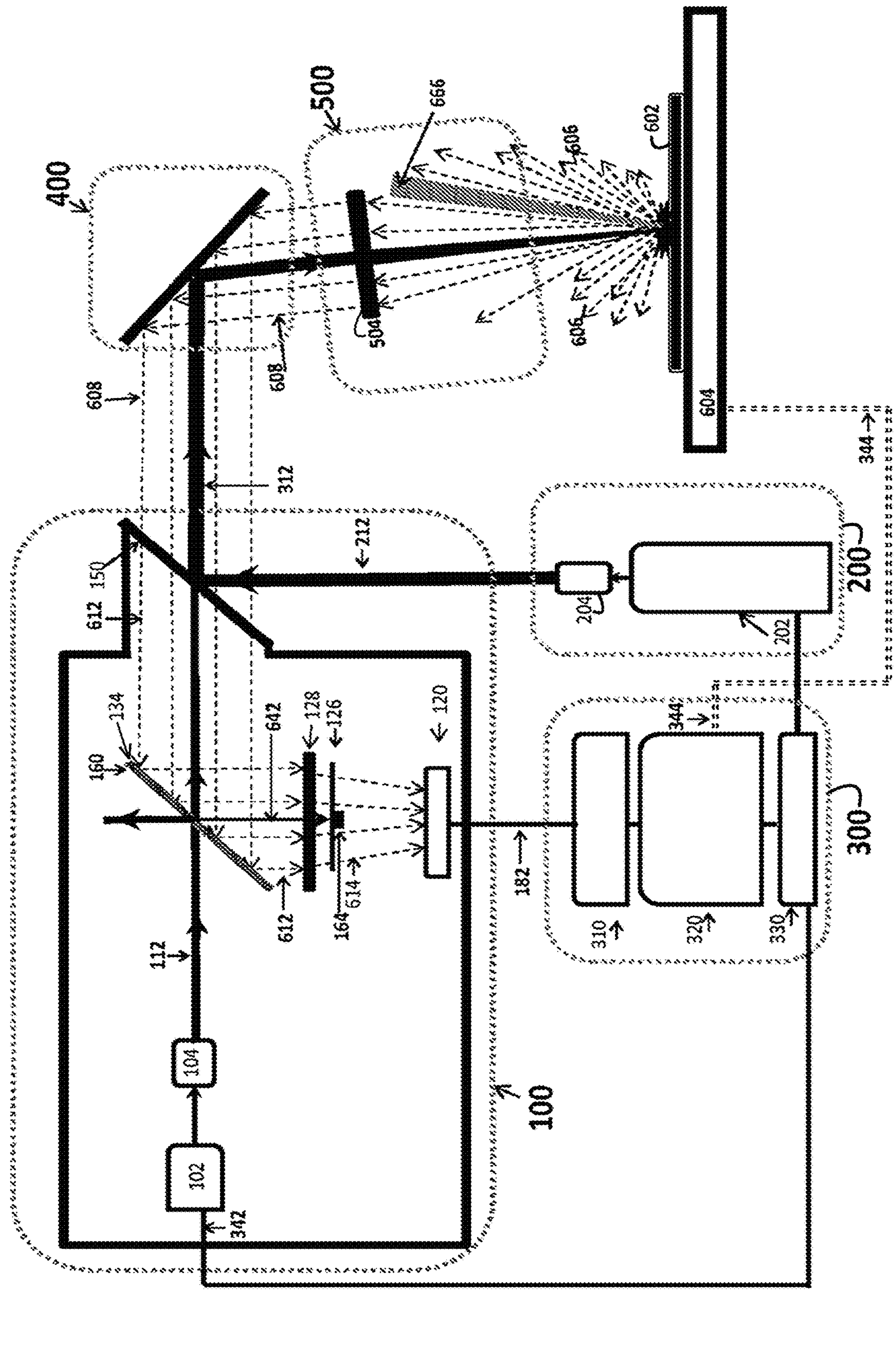
FIG. 8A shows for illustrative purposes only an example of a COA and focusing lens plane of one embodiment.

FIG. 8A shows for illustrative purposes only an example of a COA and focusing lens plane of one embodiment. FIG. 8A shows a COA and focusing lens plane that is tilted with respect to the target surface so that the probe and process beams emerging from COA are not normal to the target surface to minimize or prevent specularly-reflected beam 666 reflected off of the target surface from reaching Photo-detector(s) of one embodiment.

Figure 8B:
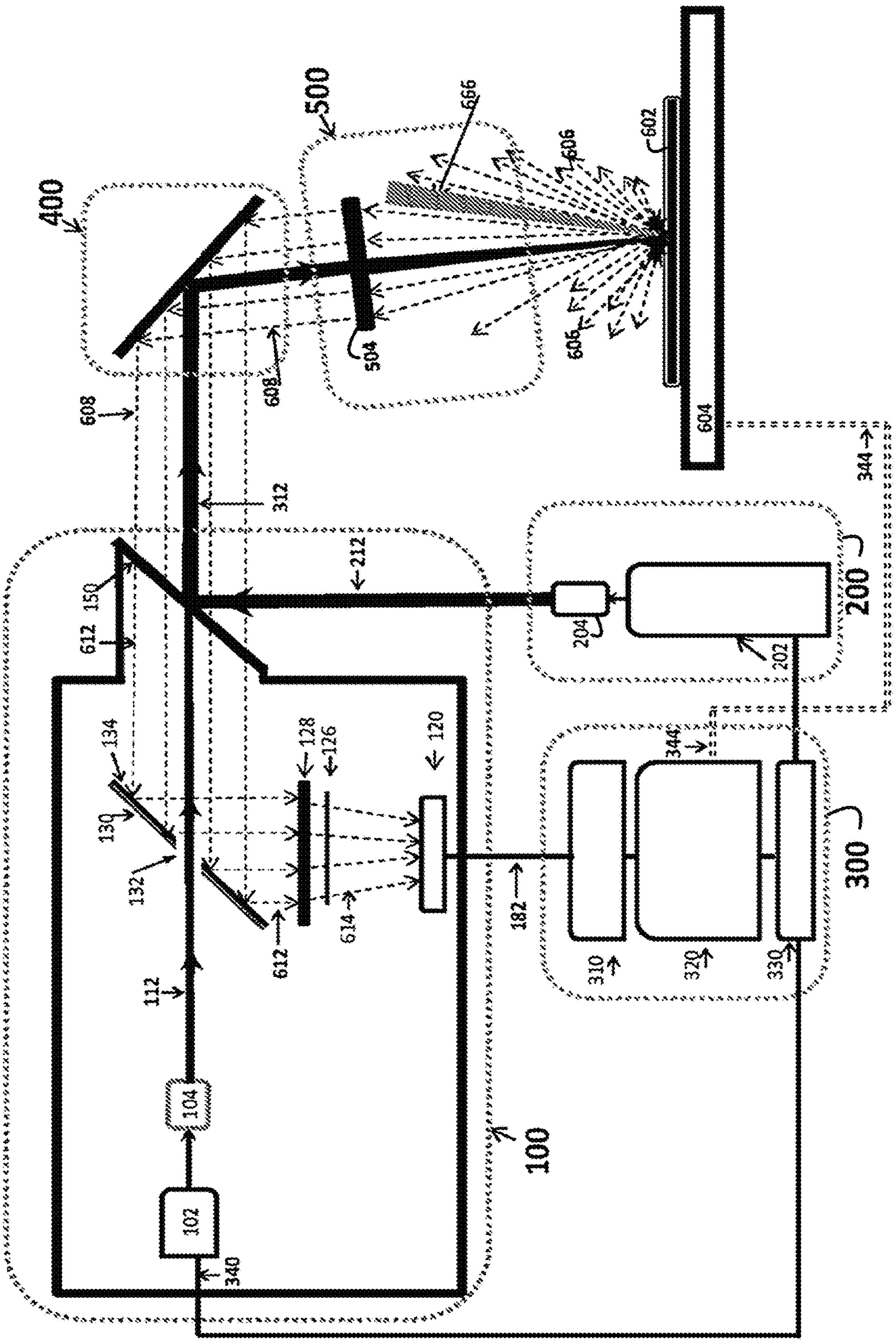
FIG. 8B shows for illustrative purposes only an example of the COA and target surface of one embodiment.

FIG. 8B shows for illustrative purposes only an example of the COA and target surface of one embodiment. FIG. 8B shows the COA and the target surface are tilted with respect to each other so that the probe and process beams emerging from COA are not normal to the target surface to minimize or prevent specularly-reflected beam 666 reflected off of the target surface from reaching Photo-detector(s) of one embodiment.

Figure 8C:
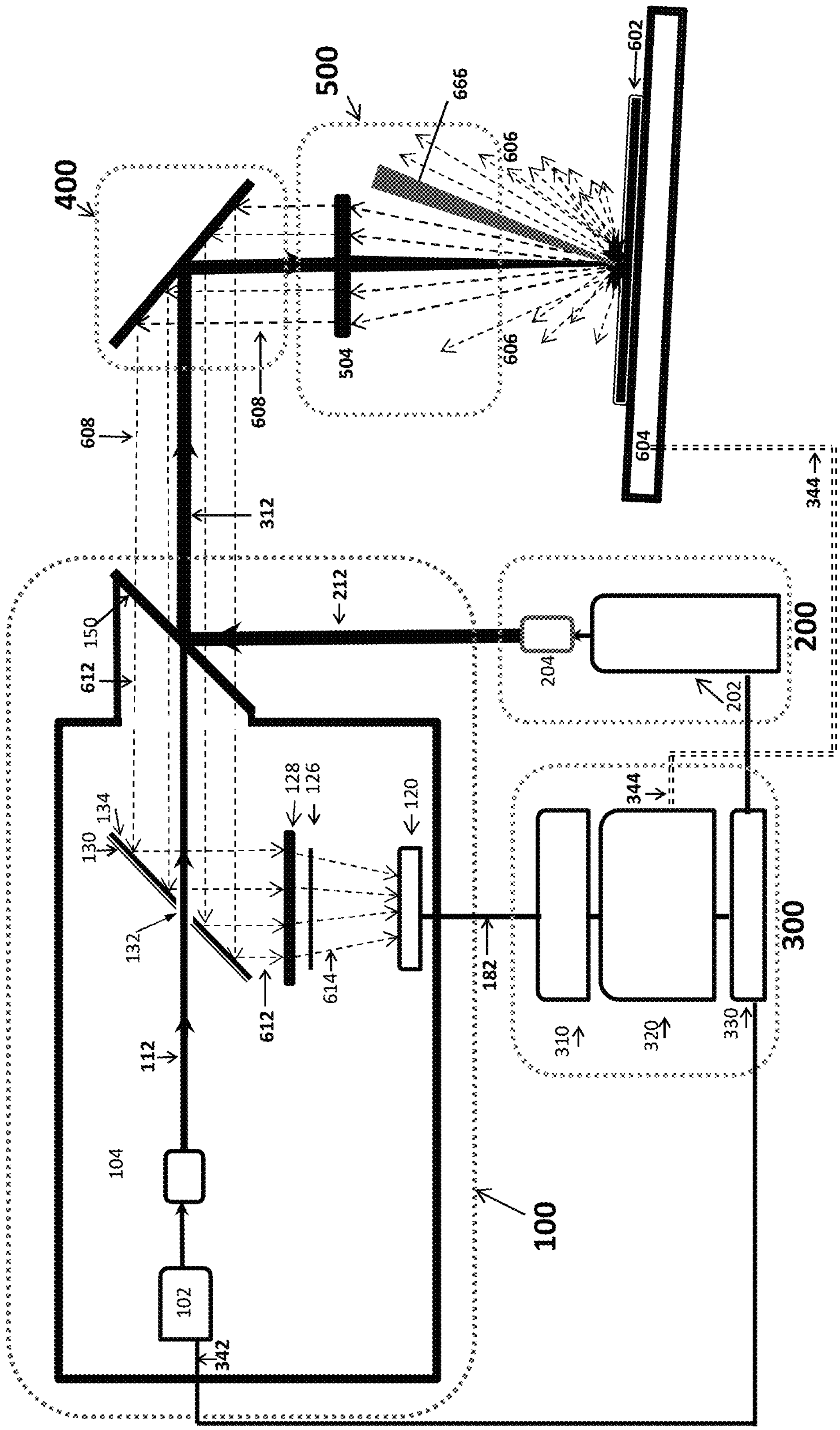
FIG. 8C shows for illustrative purposes only an example of the COA and target surface of one embodiment.

FIG. 8C shows for illustrative purposes only an example of the COA and target surface of one embodiment. FIG. 8C shows the COA and a target surface, wherein the target surface is tilted with respect to the COA (or lens) exit surface plane. Alternatively, both the target surface and the COA can be appropriately tilted with respect to each other to prevent the potential harmful influence of the specularly-reflected beam 666 reflected off of the target surface of one embodiment.

Figure 9:
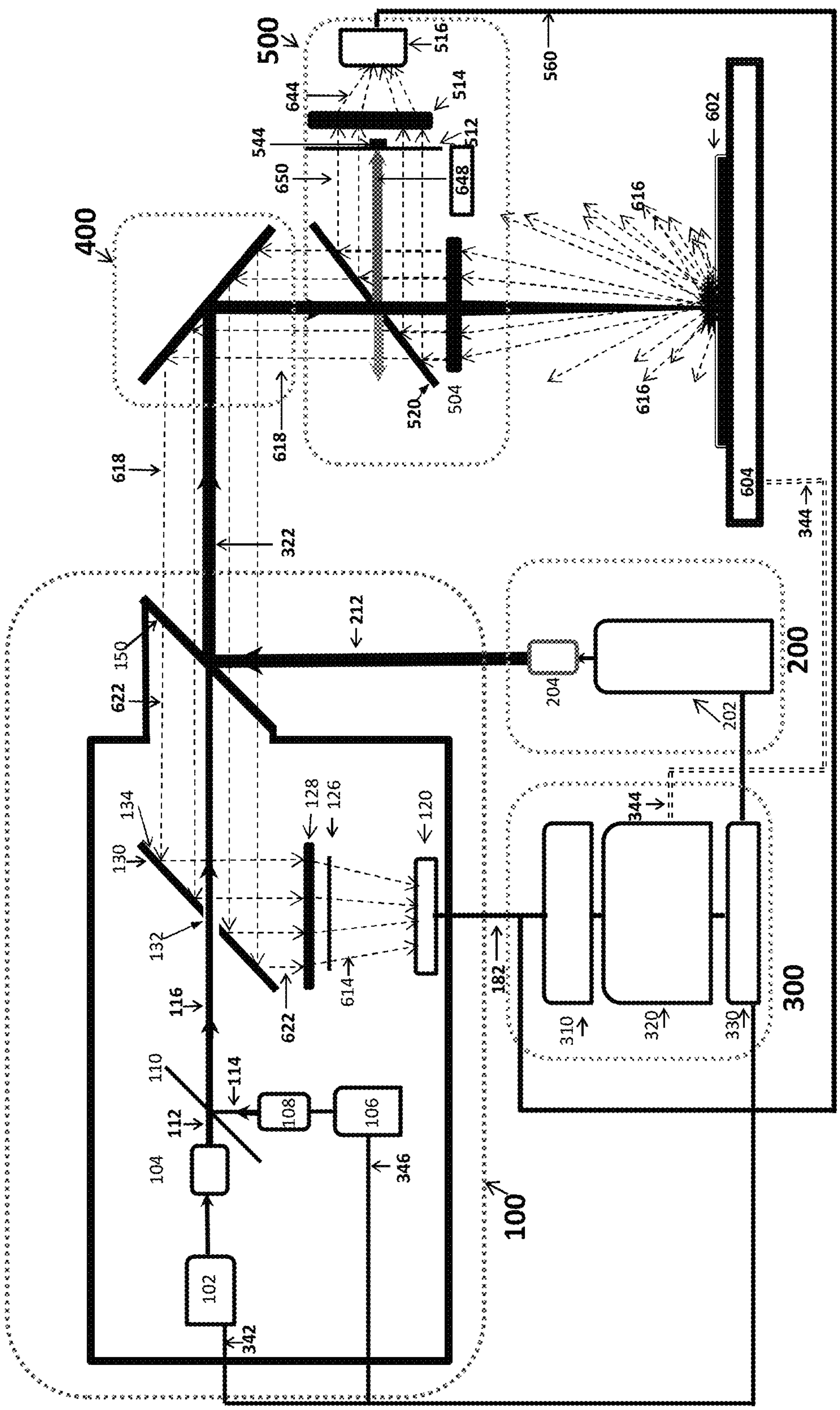
FIG. 9 shows for illustrative purposes only an example of the COA dichroic mirror of one embodiment.

FIG. 9 shows for illustrative purposes only an example of the COA dichroic mirror of one embodiment. FIG. 9 shows the COA dichroic mirror, wherein the dichroic mirror 520 transmits the process laser beam, and splits probe light beam(s); (ii) Photo-detector assembly comprising optical filter 512, that transmits probe beam 644 of desired wavelength, condensing optics 514, and Photo-detector 516. The returned scattered probe light reflected off of the target surface is partially reflected 640, by the dichroic mirror and directed toward the Photo-detector assembly that comprises a light-blocking component 544, to prevent the specularly-reflected probe beam 648 from reaching the Photo-detector 516. Further, the OSI comprises another probe laser beam source 106 that emits probe light beam 114. Probe beam 114 passes through beam diameter-adjusting optics 108, and combines with probe beam 112. The combined probe beams 116 are directed toward the COA of one embodiment.

Figure 10:
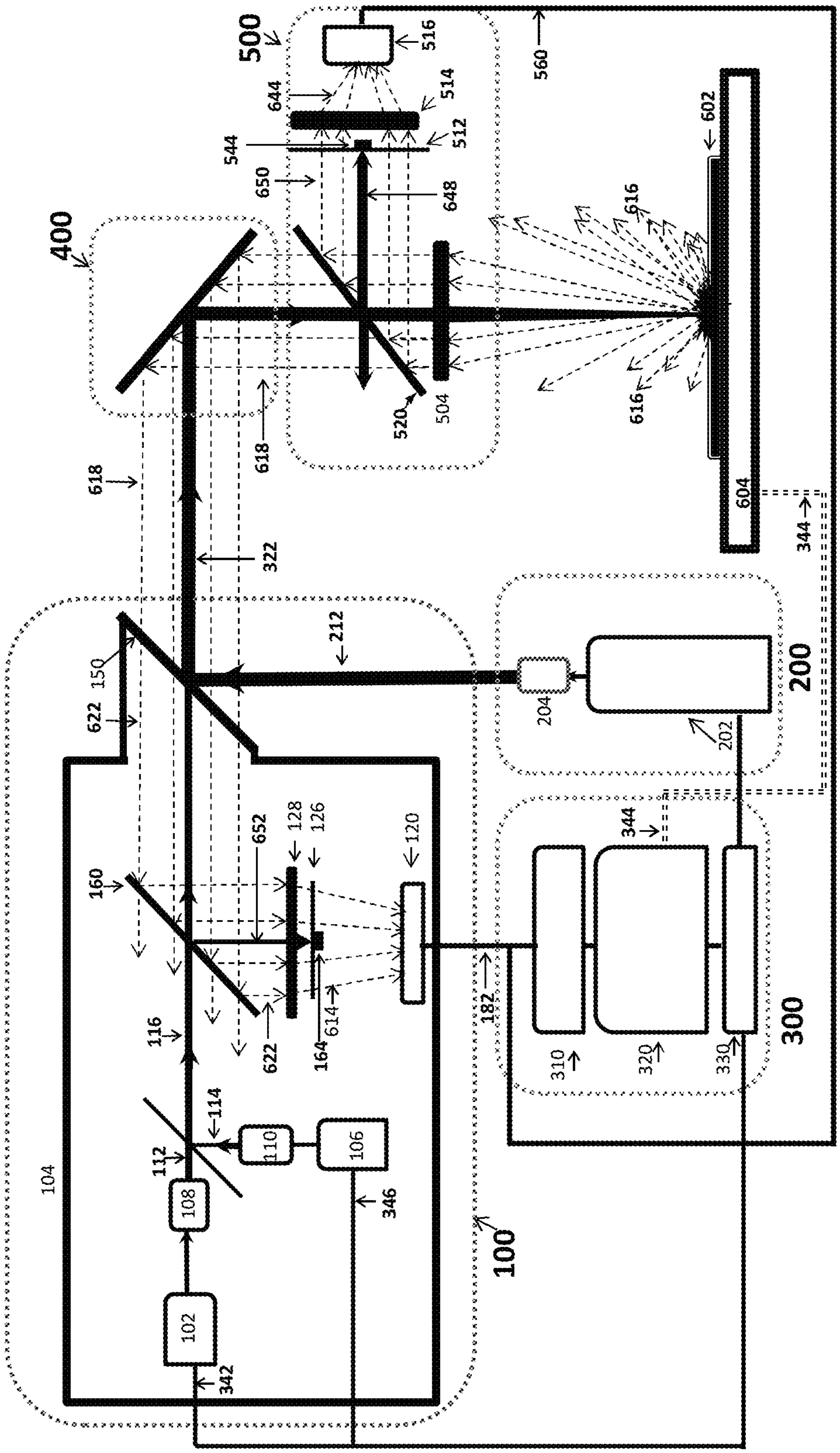
FIG. 10 shows for illustrative purposes only an example of a beam splitting optic of one embodiment.

FIG. 10 shows for illustrative purposes only an example of a beamsplitting optic of one embodiment. FIG. 10 shows the OSI with a beamsplitting optic 160, in place of the Optical Reflector Component 130, wherein the beam splitting optic 160 splits returned scattered probe light 622, reflected off of the target surface, reflects, and directs the split beam toward the Photo-detector assembly deployed in the OSI that further, wherein the Photo-detector assembly comprises a light-blocking component 164, that prevents the specularly-reflected probe beams 652 from reaching the Photo-detector 120 of one embodiment.

Figure 11A:
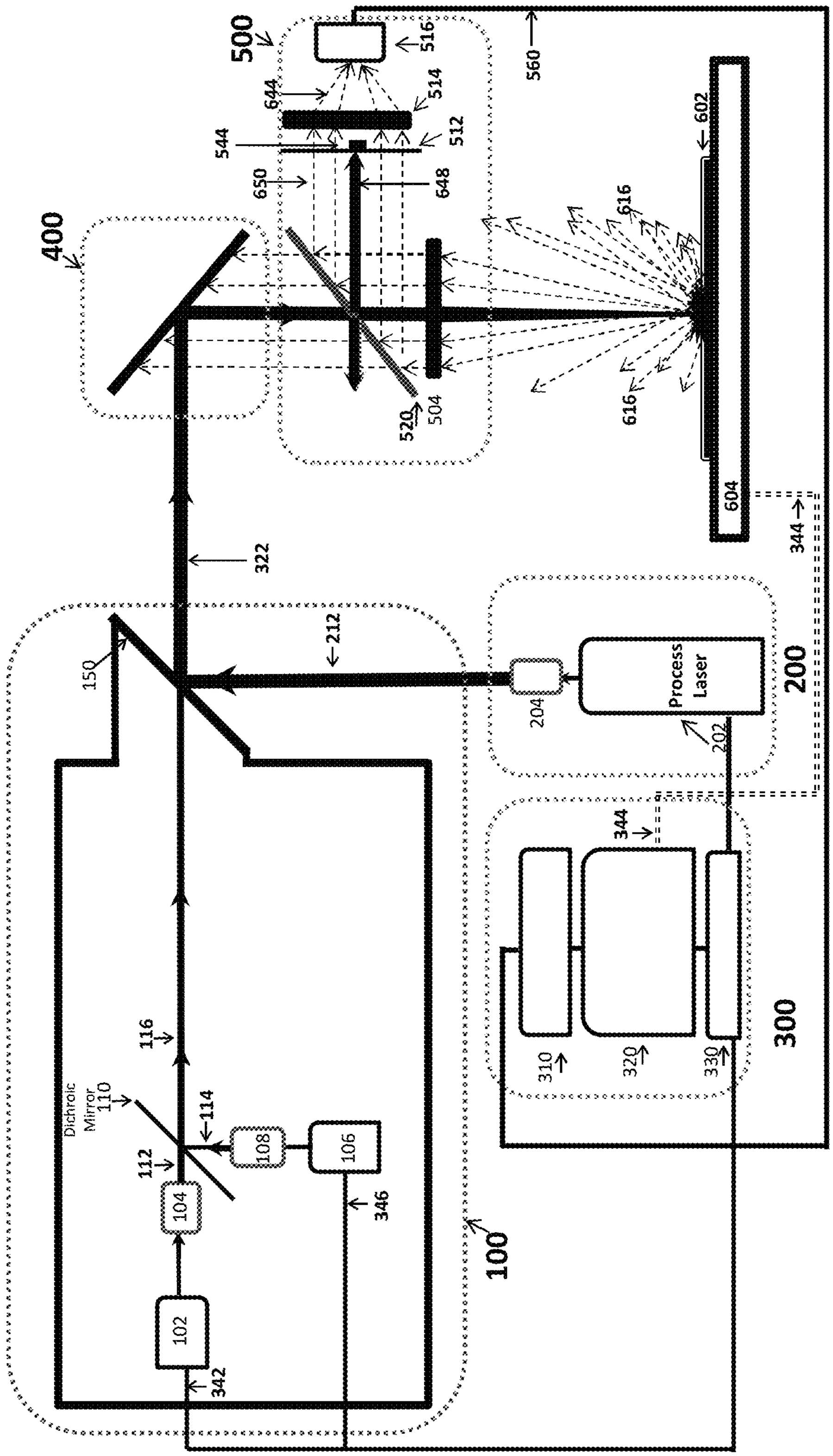
FIG. 11A shows for illustrative purposes only an example of the OSI without the Photo-detector and the Optical Reflector Component of one embodiment.

FIG. 11A shows for illustrative purposes only an example of the OSI without the Photo-detector and the Optical Reflector Component of one embodiment. FIG. 11A shows the OSI without the Photo-detector and the Optical Reflector Component 130 with pass-thru hole. The COA dichroic mirror 520 is shown, wherein the dichroic mirror 520 transmits the process laser beam and splits probe light beam(s). The Photo-detector 516 and a light-blocking component 544 prevent the secularly-reflected probe beam 648 from reaching the Photo-detector 516 of one embodiment.

Figure 11B:
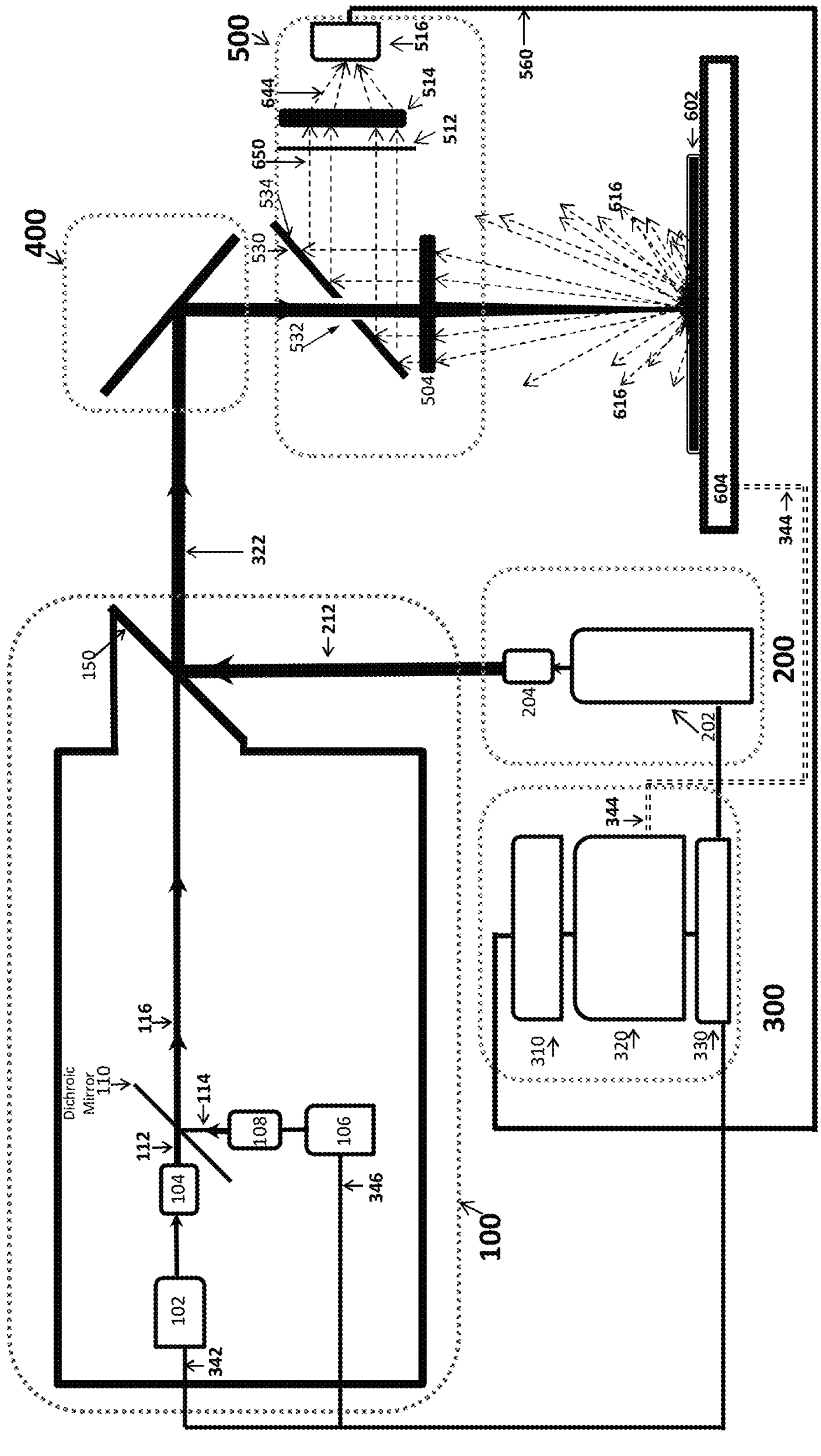
FIG. 11B shows for illustrative purposes only an example of a COA mirror with a pass-thru hole of one embodiment.

FIG. 11B shows for illustrative purposes only an example of a COA mirror with a pass-thru hole of one embodiment. FIG. 11B shows the COA with a mirror 530 with a pass-thru hole, instead of dichroic mirror 520, placed in the path of the probe beams inside COA, wherein the mirror 530 comprising a surface of high-reflectivity 534, and pass-thru opening 532, to permit the combined outgoing process and probe beams 322 to pass through the opening. The returned scattered probe light 616 reflected off of the target surface is partially reflected 650 by mirror 530 and directed toward the Photo-detector assembly and impinges Photo-detector 516 of one embodiment.

Figure 12:
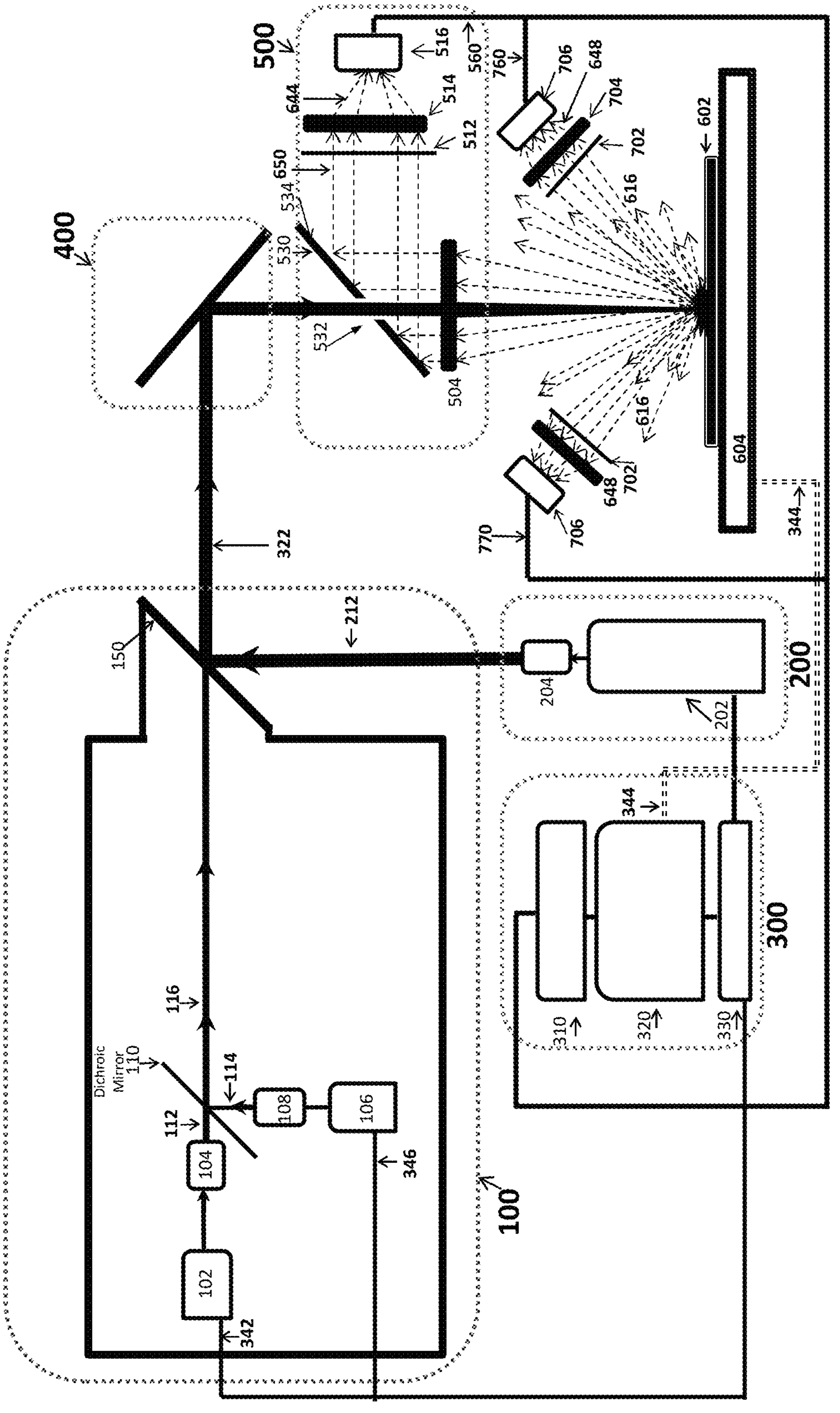
FIG. 12 shows for illustrative purposes only an example of auxiliary Photo-detectors of one embodiment.

FIG. 12 shows for illustrative purposes only an example of auxiliary Photo-detectors of one embodiment. FIG. 12 shows auxiliary Photo-detectors 706 is coupled to the COA and appropriately positioned between the COA and target surface to directly pick up some of the scattered light off of the target surface, not collected by the COA focusing lens of one embodiment.

Figure 13:
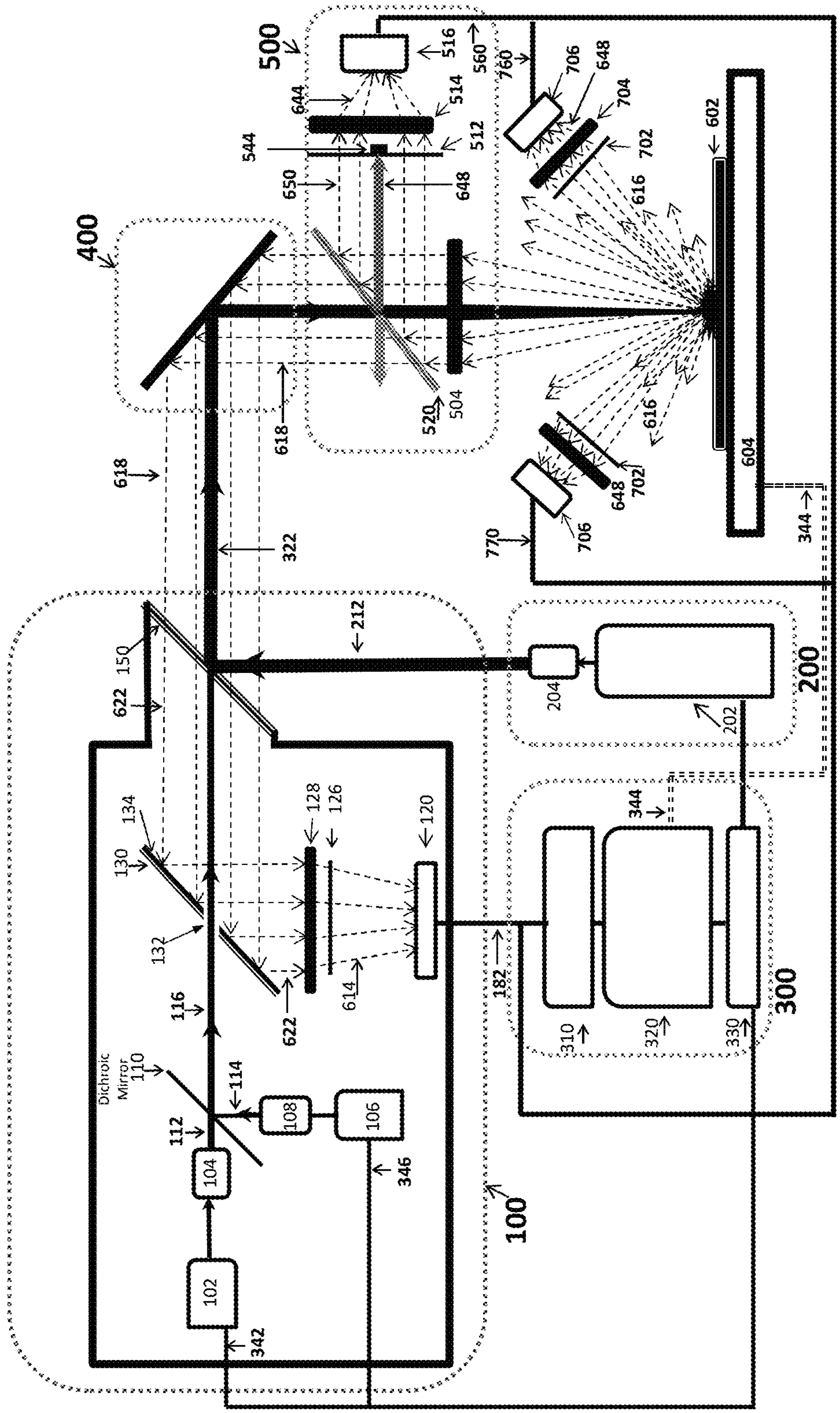
FIG. 13 shows for illustrative purposes only an example of auxiliary Photo-detectors coupled to the COA of one embodiment.

FIG. 13 shows for illustrative purposes only an example of auxiliary Photo-detectors coupled to the COA of one embodiment. FIG. 13 shows auxiliary Photo-detectors 706 coupled to the COA and appropriately positioned between the COA and target surface to directly pick up scattered light off of the target surface of one embodiment.

Figure 14:
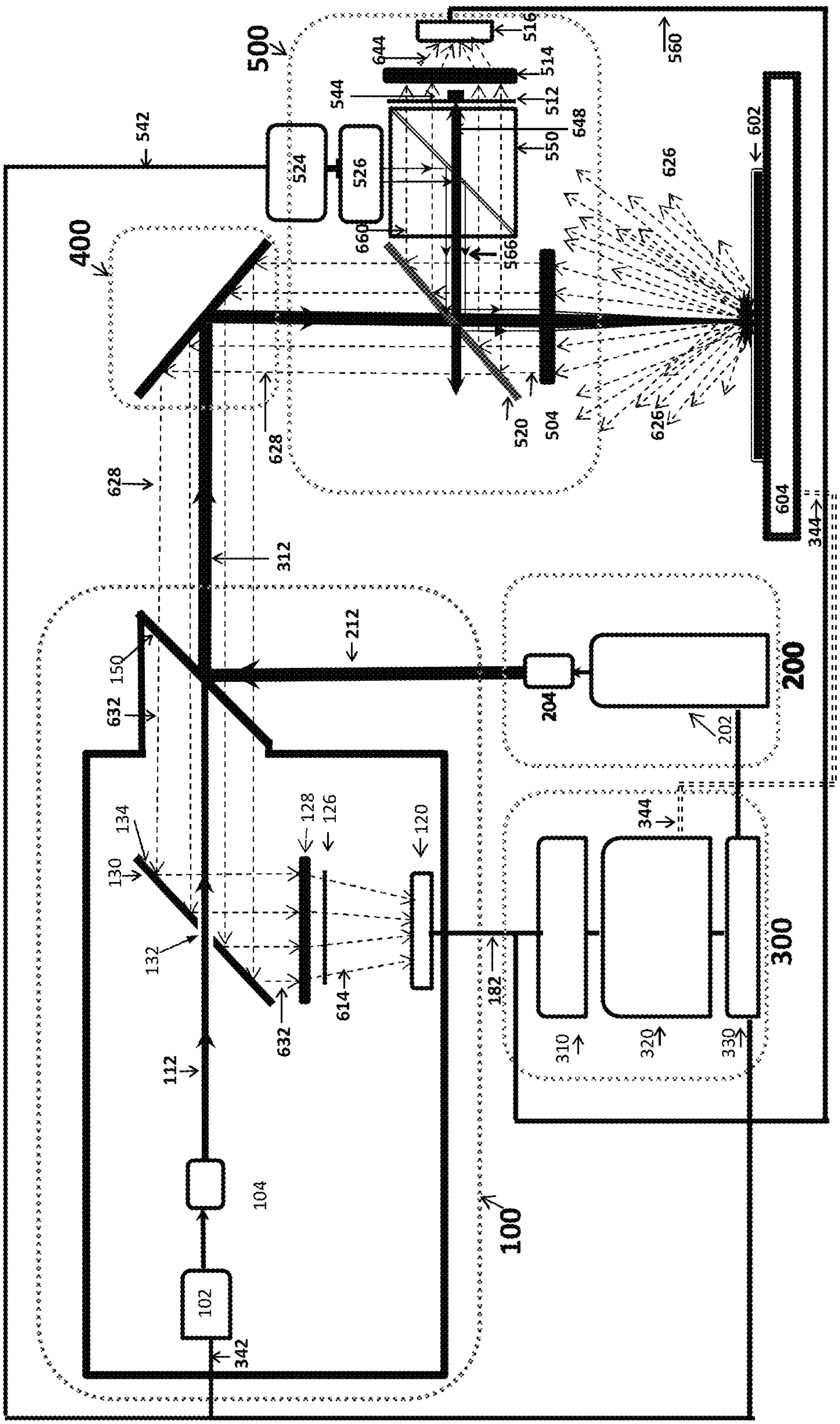
FIG. 14 shows for illustrative purposes only an example of an additional probe laser source of one embodiment.

FIG. 14 shows for illustrative purposes only an example of an additional probe laser source of one embodiment. FIG. 14 shows coupled to the COA an additional probe laser source 524 of desired wavelength $\square_3$, laser beam adjusting optics 526, and beam splitter 550, to allow partial reflection/transmission of the probe light 566 (emitted by laser 524). And further, wherein the OSI comprises one probe laser source 102 of one embodiment.

Figure 15A:
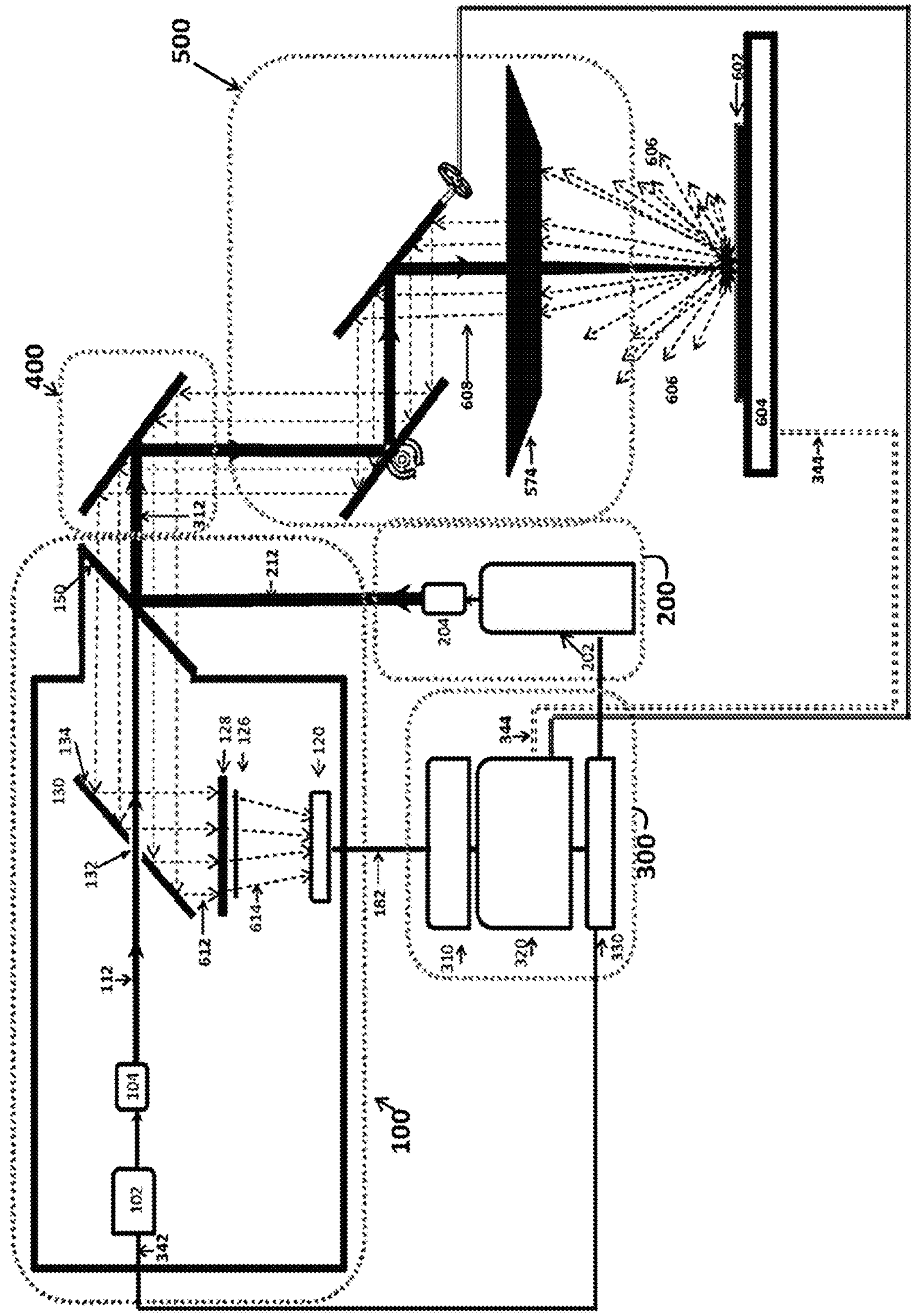
FIG. 15A shows for illustrative purposes only an example of a beam scanning mechanism of one embodiment.

FIG. 15A shows for illustrative purposes only an example of a beam scanning mechanism of one embodiment. FIG. 15A shows coupled to the COA a beam scanning mechanism. The beam scanning mechanism is controlled and monitored by the system Control Logic to position the process and probe laser beams on the target surface, and appropriate focusing lens, e.g., Telecentric or F-Theta lens 574 of one embodiment.

Figure 15B:
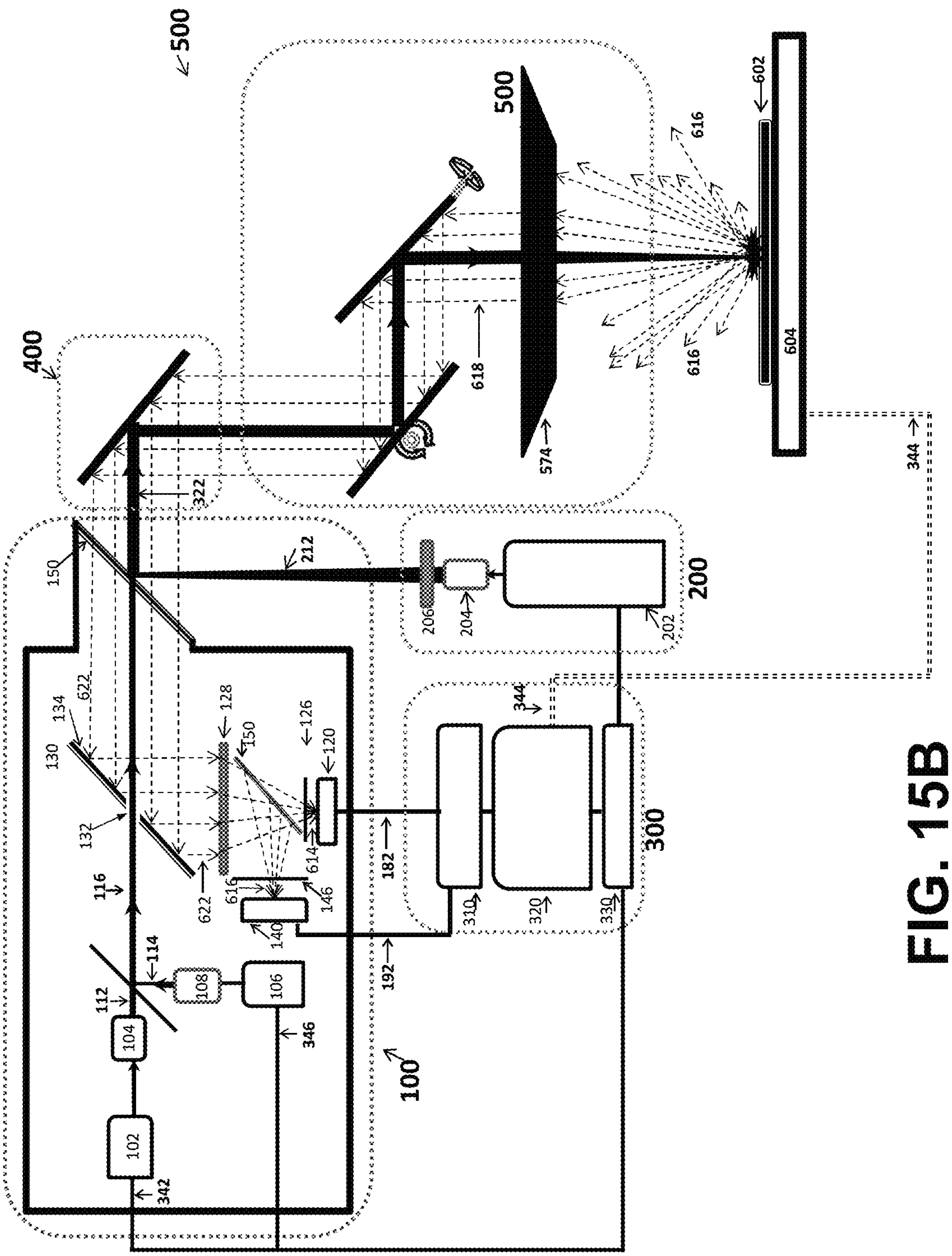
FIG. 15B shows for illustrative purposes only an example of a beam scanning mechanism of one embodiment.

FIG. 15B shows for illustrative purposes only an example of a beam scanning mechanism of one embodiment. FIG. 15B shows the COA coupled beam scanning mechanism, that is controlled and monitored by the system Control Logic to position the process and probe laser beams on the target surface, and appropriate focusing lens, e.g., Telecentric or F-Theta lens 574. In this instance the beam passes through the additional Photo-detector 140 of one embodiment.

Figure 16:
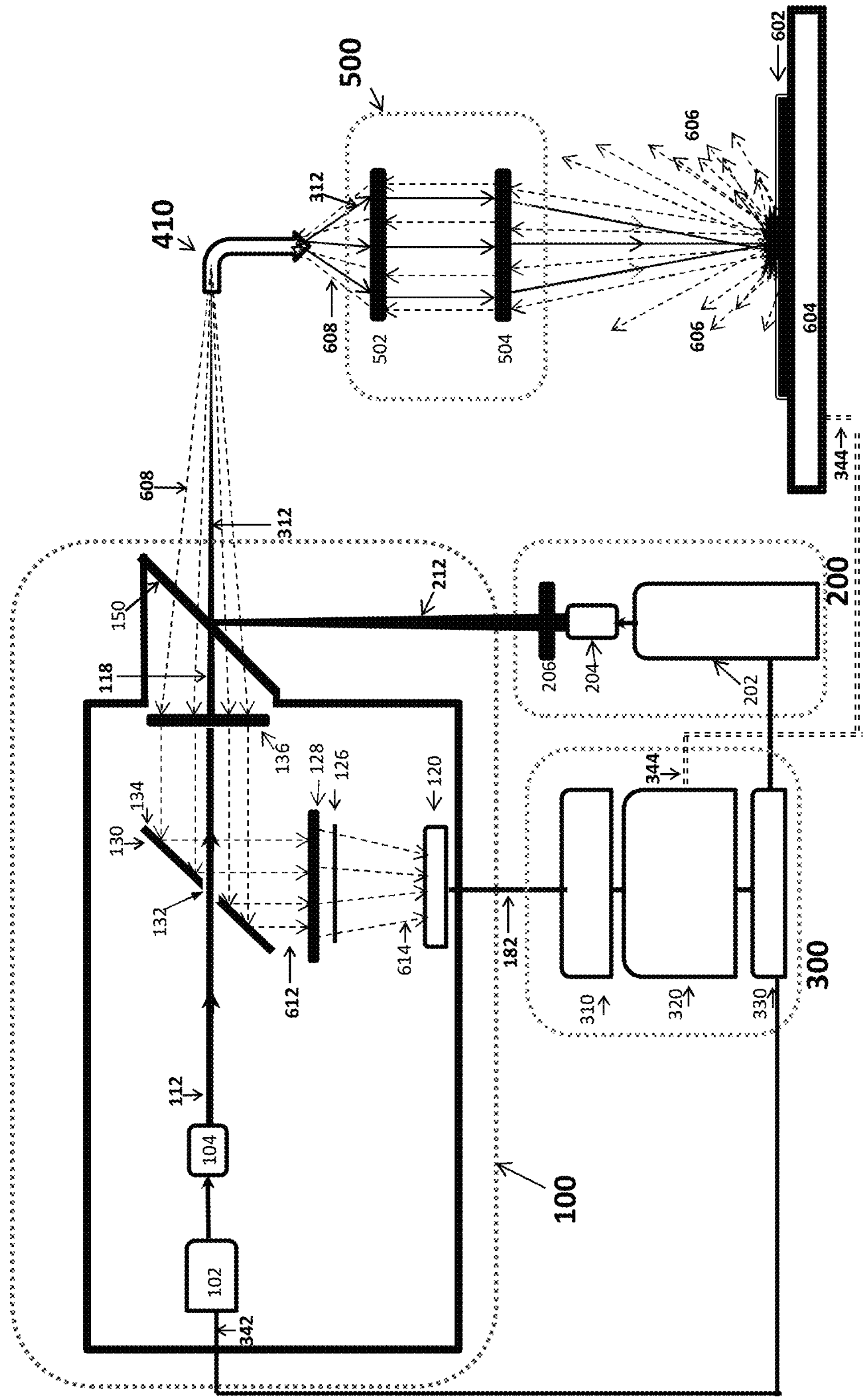
FIG. 16 shows for illustrative purposes only an example of an optics path of one embodiment.

FIG. 16 shows for illustrative purposes only an example of an optics path of one embodiment. FIG. 16 shows an optics path comprises a fiber-optic medium 410, and, wherein process beam and probe laser beams are focused by focusing lenses 206 and 136, respectively, and coupled into the fiber-optic medium 410 which transport the beams to the COA 500, wherein the COA comprises collimating lens 502 and focusing lens 504 of one embodiment.

Figure 17:
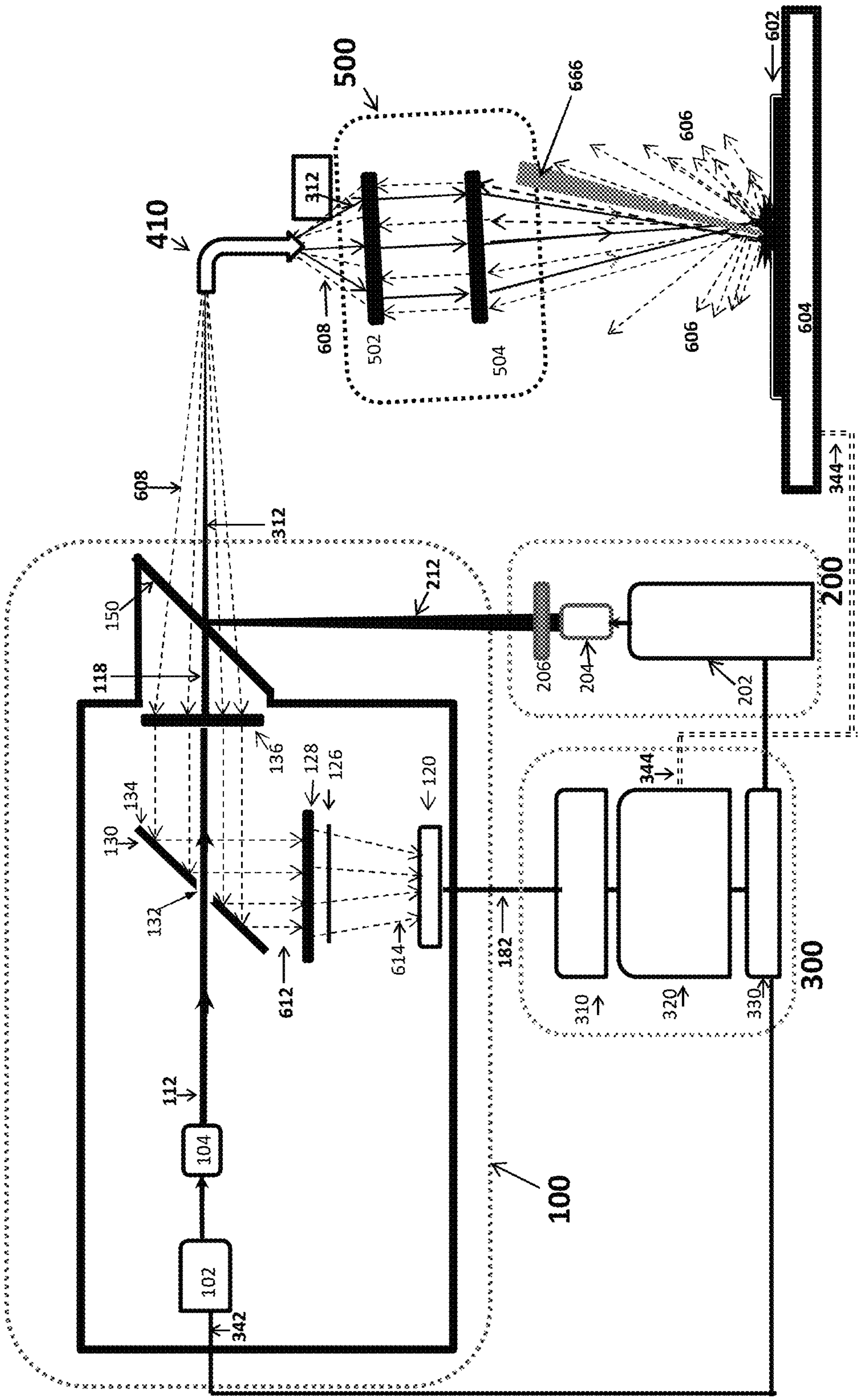
FIG. 17 shows for illustrative purposes only an example of a process and probe laser beams are coupled into a fiber-optic medium of one embodiment.

FIG. 17 shows for illustrative purposes only an example of a process and probelaser beams are coupled into a fiber-optic medium of one embodiment. FIG. 17 shows a process and probe laser beams are coupled into a fiber-optic medium 410 of one embodiment.

Figure 18:
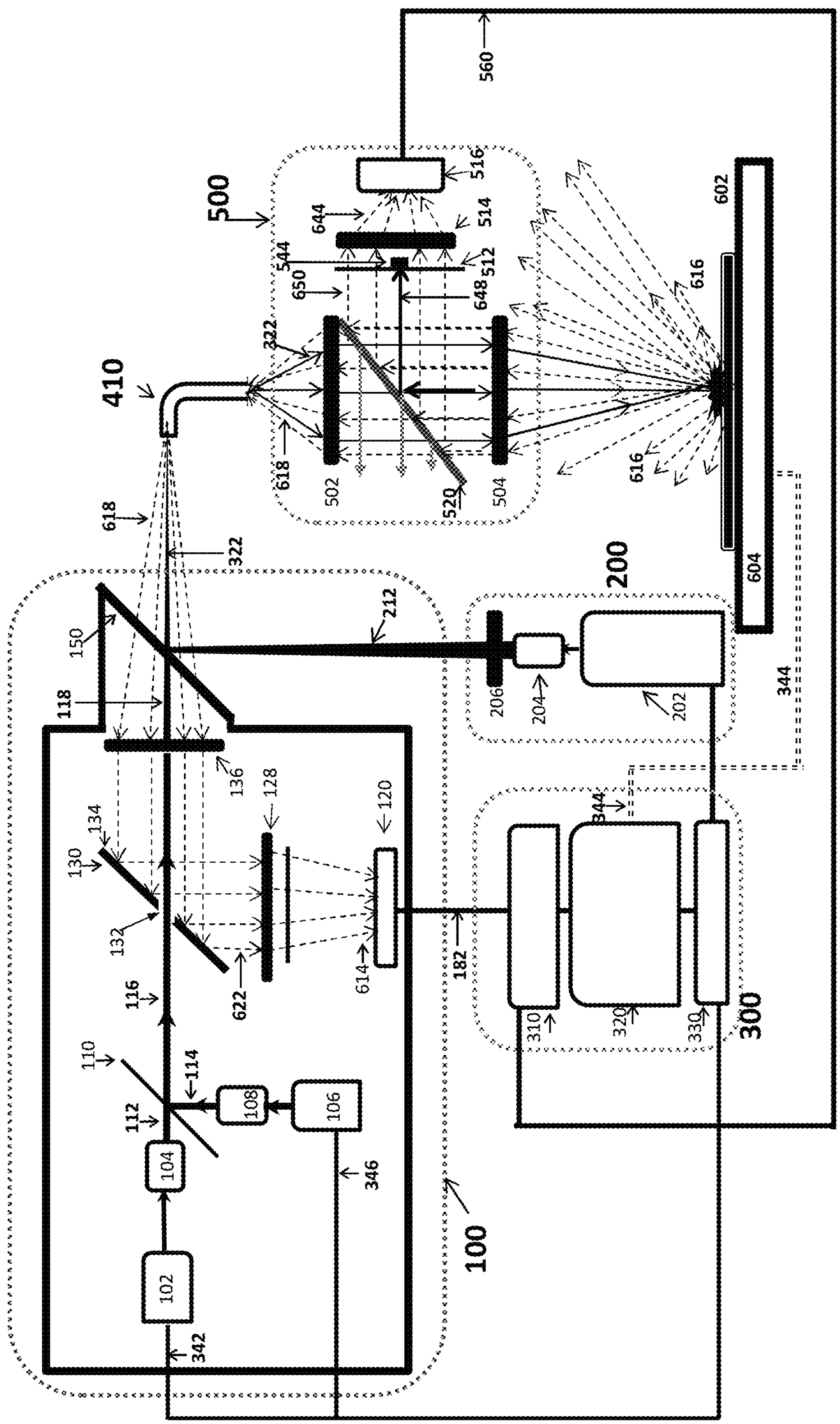
FIG. 18 shows for illustrative purposes only an example of a process and probe laser beams are coupled into a fiber-optic medium of one embodiment.

FIG. 18 shows for illustrative purposes only an example of a process and probelaser beams are coupled into a fiber-optic medium of one embodiment. FIG. 18 shows the process and probelaser beams coupled into the fiber-optic medium 410, as described in FIG. 16 of one embodiment.

Figure 19:
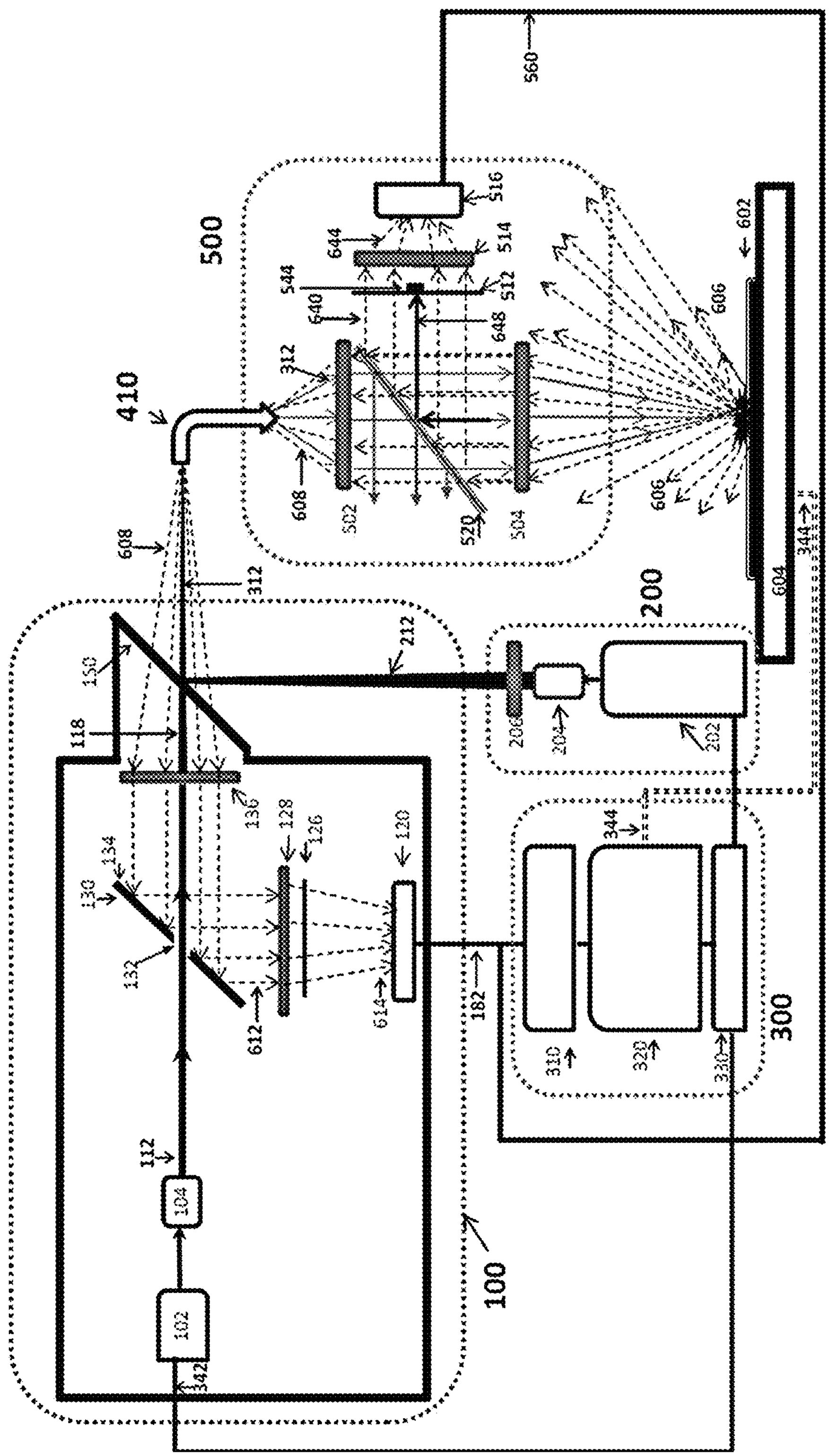
FIG. 19 shows for illustrative purposes only an example of a probe laser beams coupled into a fiber-optic medium of one embodiment.

FIG. 19 shows for illustrative purposes only an example of a probelaser beams coupled into a fiber-optic medium of one embodiment. FIG. 19 shows the OSI comprising one probe laser beam 112 coupled into the fiber-optic medium 410 of one embodiment.

Figure 20:
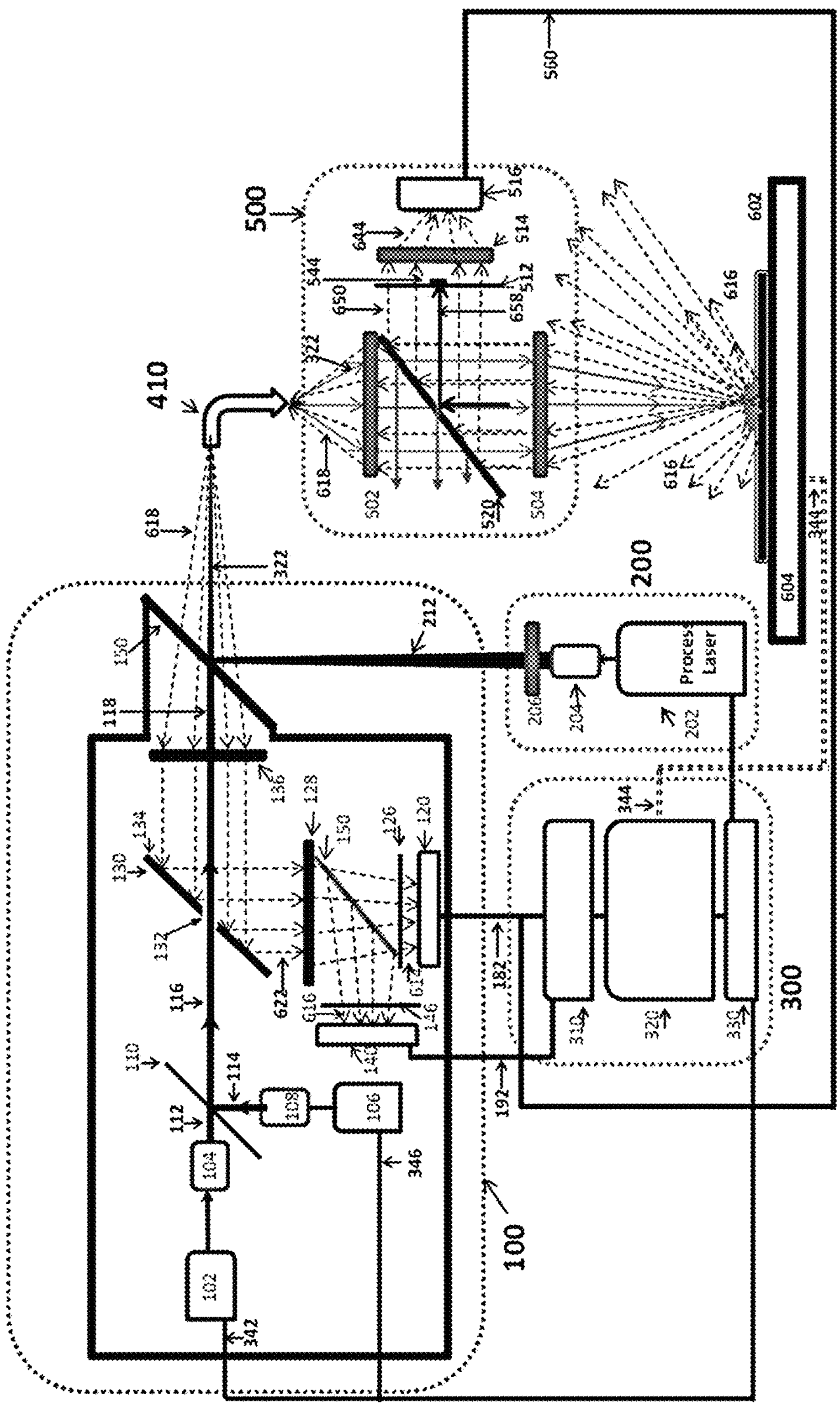
FIG. 20 shows for illustrative purposes only an example of an OSI additional Photo-detector of one embodiment.

FIG. 20 shows for illustrative purposes only an example of an OSI additional Photo-detector of one embodiment. FIG. 20 shows the OSI comprises an additional Photo-detector 140 of one embodiment.

Figure 21A:
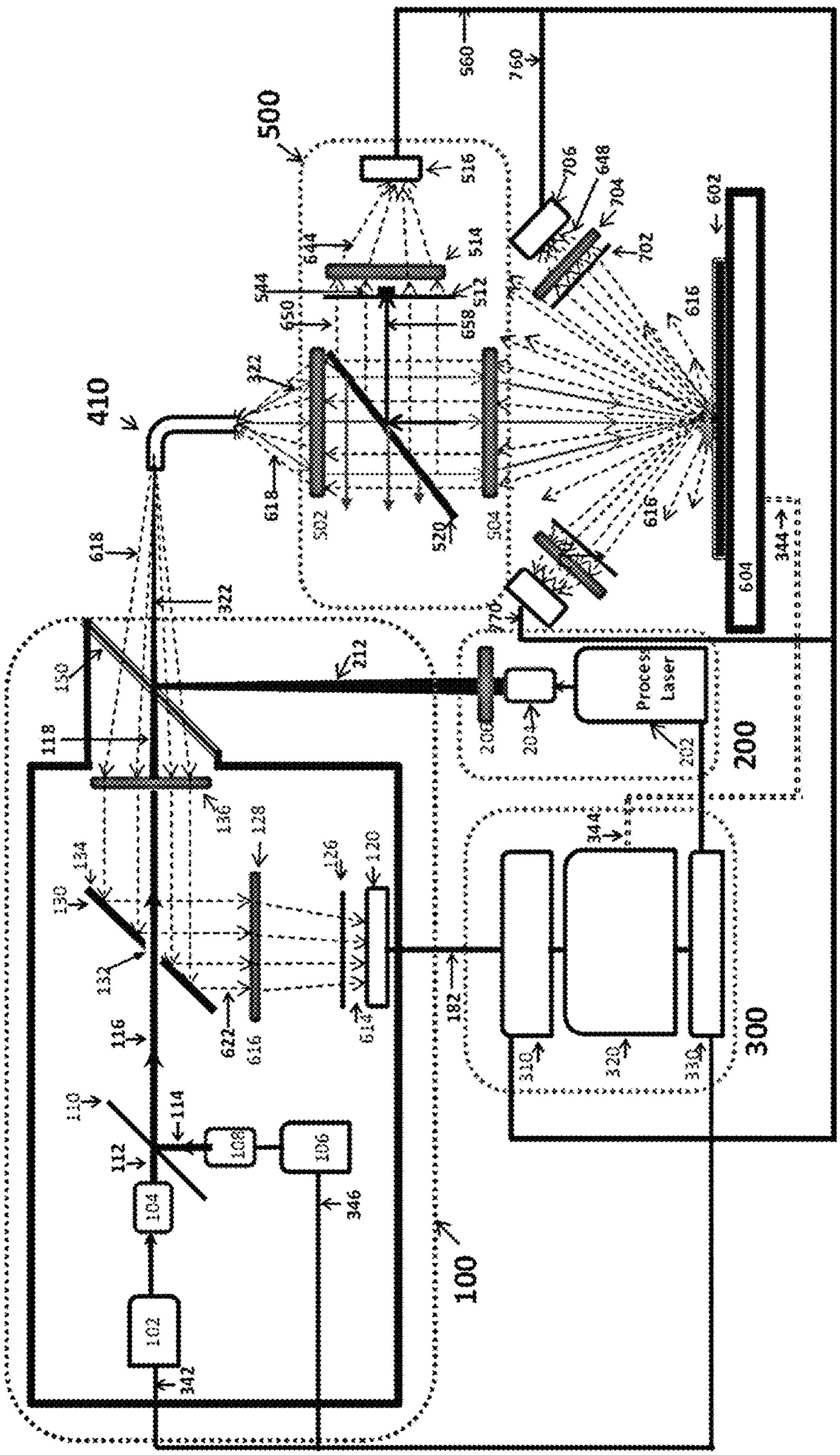
FIG. 21A shows for illustrative purposes only an example of a fiber-optic medium of one embodiment.

FIG. 21A shows for illustrative purposes only an example of a fiber-optic medium of one embodiment. FIG. 21A shows the optics path comprises a fiber-optic medium 410, and process and probe laser beams coupled into the fiber-optic medium 410, as described in FIG. 20.

Figure 21B:
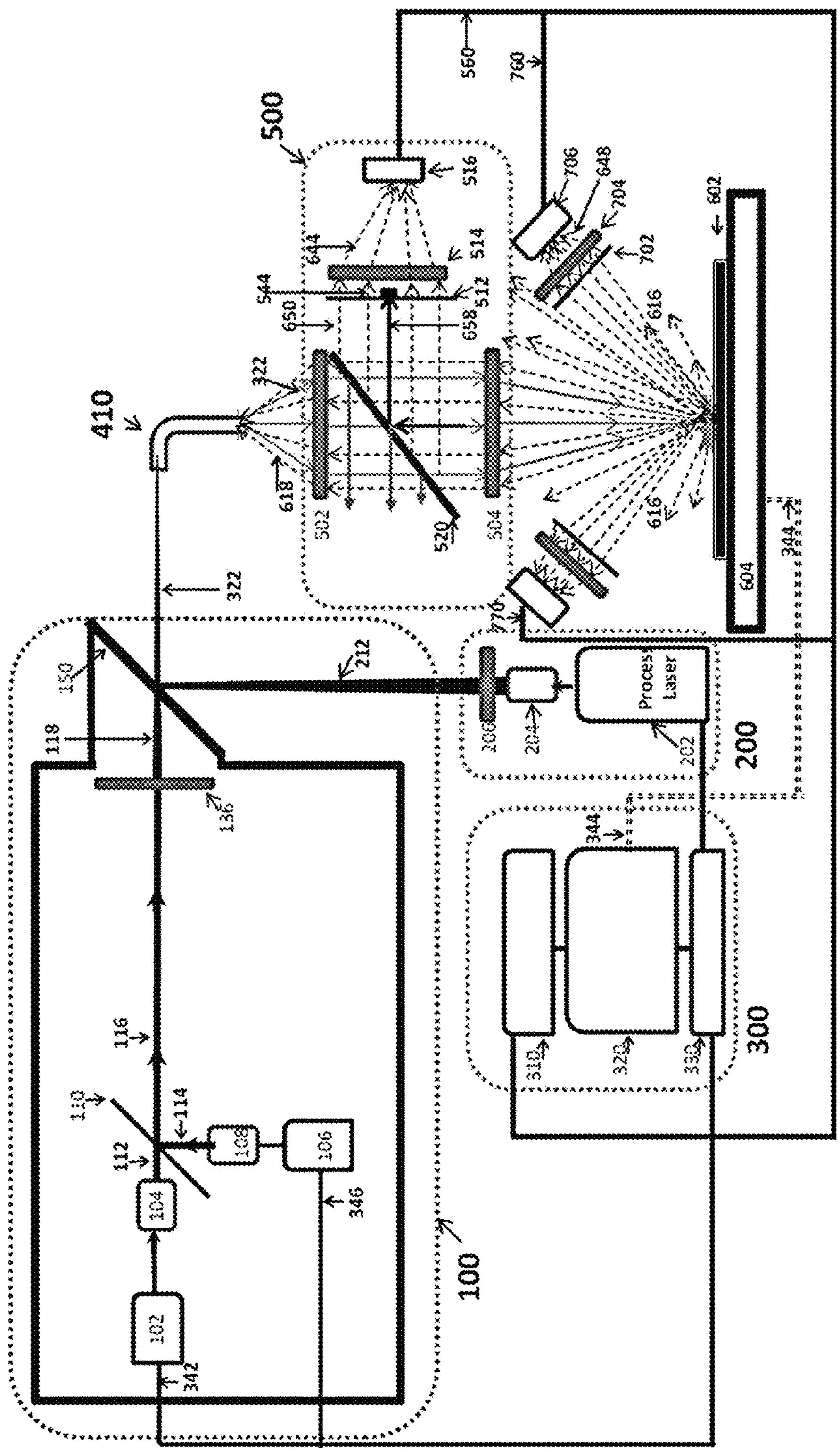
FIG. 21B shows for illustrative purposes only an example of an additional Photo-detector CSI interaction with the fiber-optic medium of one embodiment.

FIG. 21B shows for illustrative purposes only an example of an additional Photo-detector CSI interaction with the fiber-optic medium of one embodiment. FIG. 21B shows an additional Photo-detector 140 CSI interaction with the fiber-optic medium 410 of one embodiment.

Figure 22:
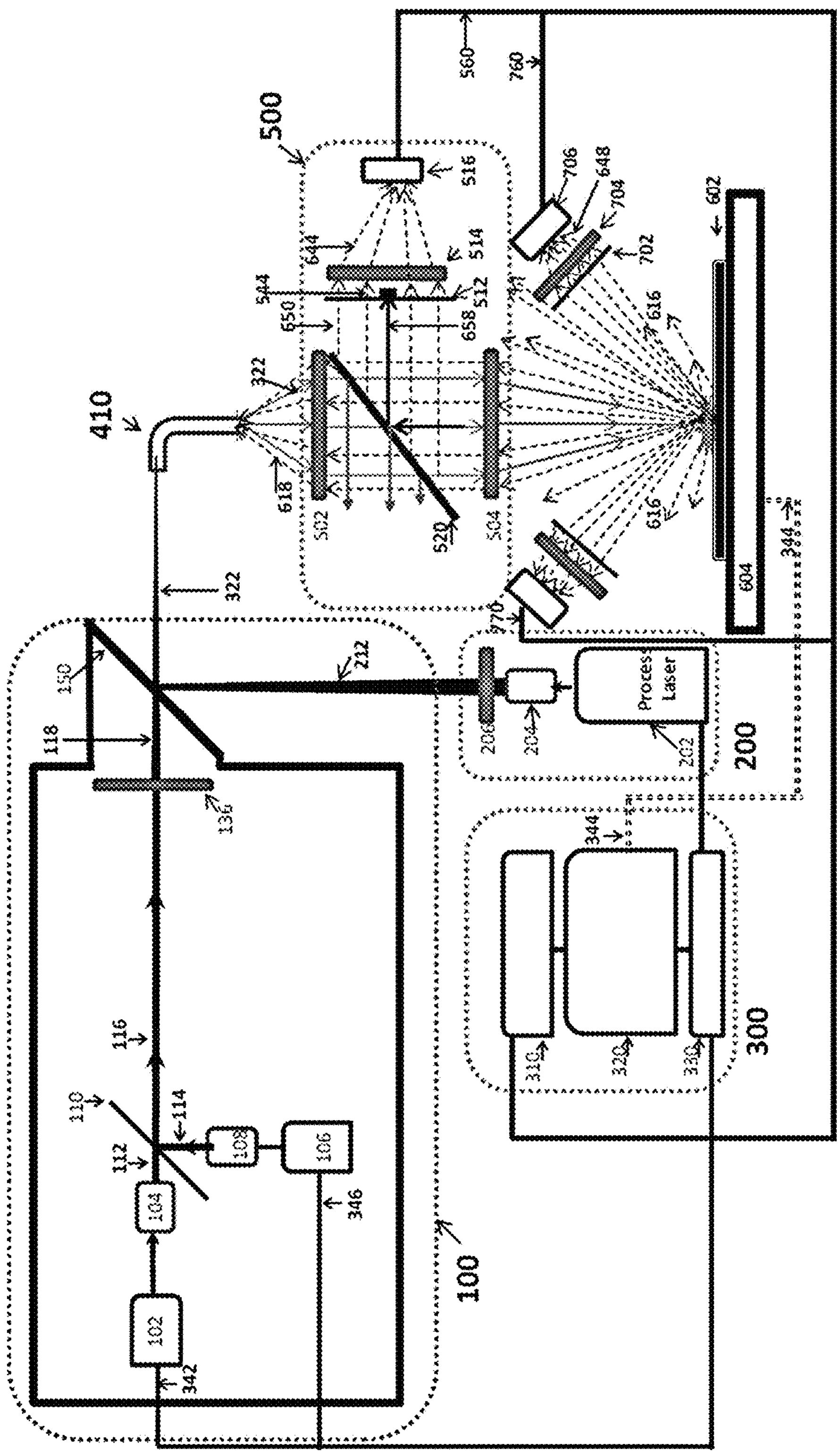
FIG. 22 shows for illustrative purposes only an example of process and probe laser beams coupled into the fiber-optic medium of one embodiment.

FIG. 22 shows for illustrative purposes only an example of process and probe laser beams coupled into the fiber-optic medium of one embodiment. FIG. 22 shows the optics path comprises a fiber-optic medium 410, and process and probe laser beams coupled into the fiber-optic medium 410, as described in FIG. 16. Further, the COA comprise the beam splitter 520 to direct part of probe light beam reflected off of the target surface toward the Photo-detector 516 of one embodiment.

Figure 23:
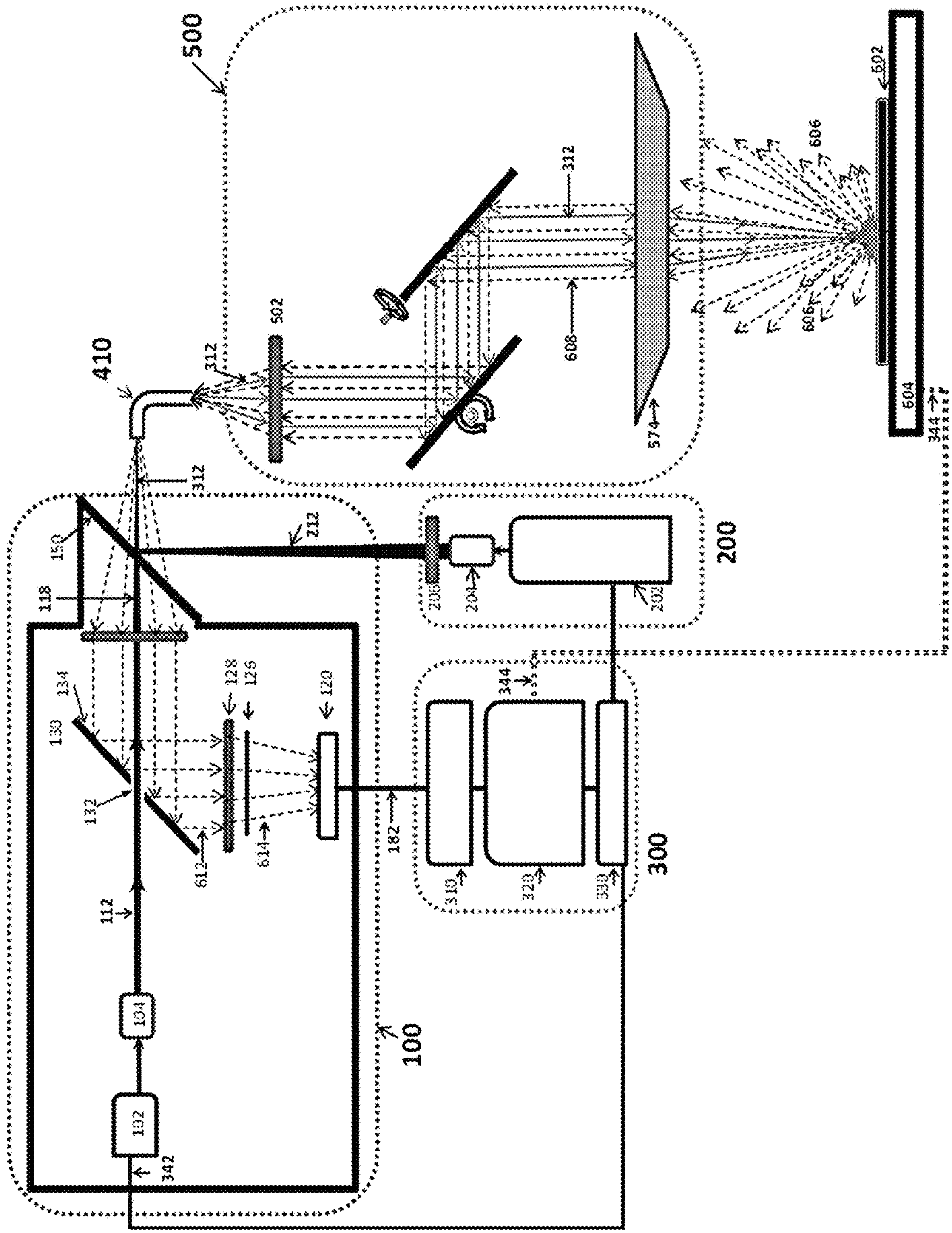
FIG. 23 shows for illustrative purposes only an example of an optics path comprising a fiber-optic medium of one embodiment.

FIG. 23 shows for illustrative purposes only an example of an optics path comprising a fiber-optic medium of one embodiment. FIG. 23 shows the optics path comprises a fiber-optic medium 410, and process and probe laser beams are coupled into the fiber-optic medium 410, as described in FIG. 16 of one embodiment.

Figure 24A:
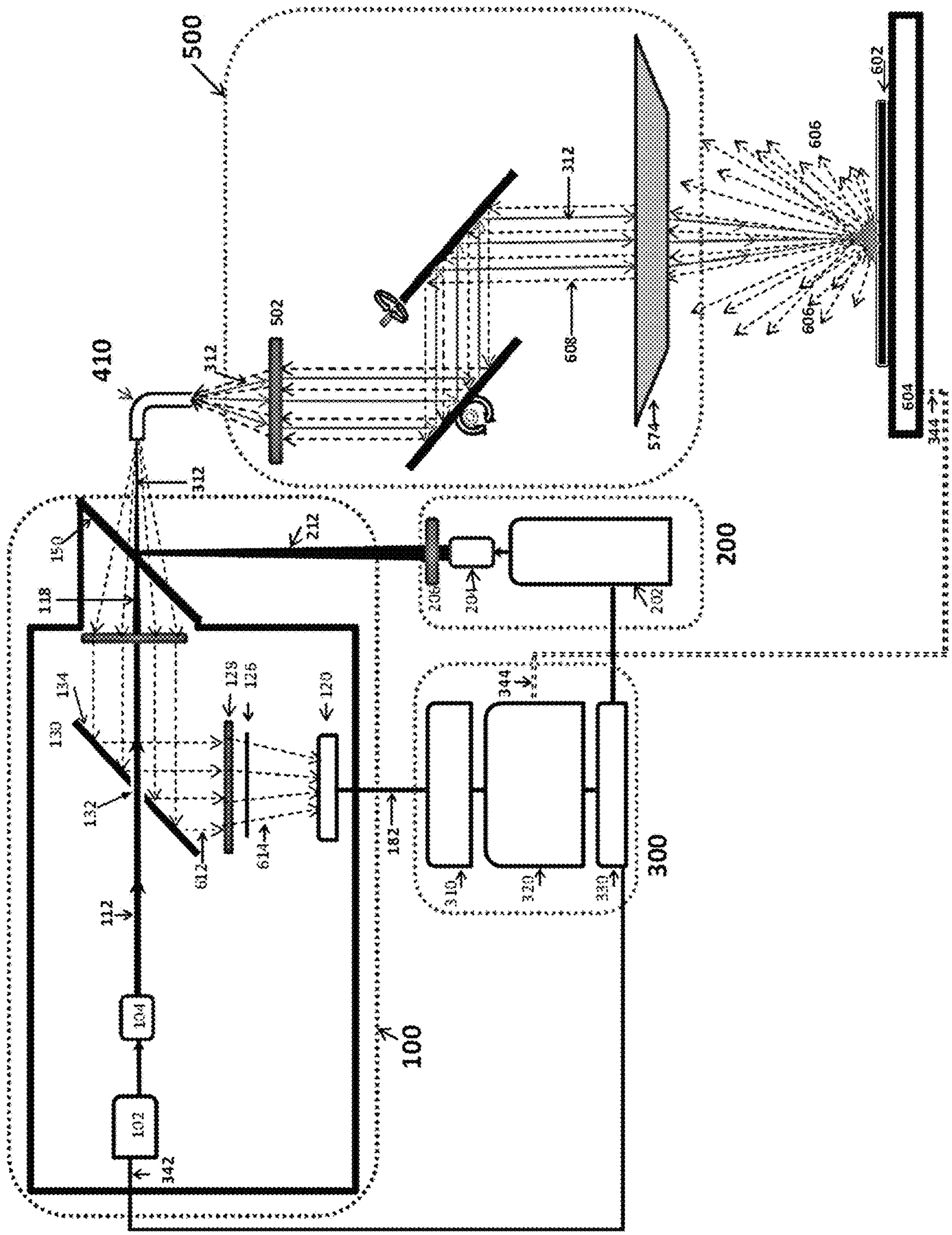
FIG. 24A shows for illustrative purposes only an example of an optics path comprising a fiber-optic medium of one embodiment.

FIG. 24A shows for illustrative purposes only an example of an optics path comprising a fiber-optic medium of one embodiment. FIG. 24A shows the optics path comprises a fiber-optic medium 410, and process and probe laser beams coupled into the fiber-optic medium 410, as described in FIG. 16 of one embodiment.

Figure 24B:
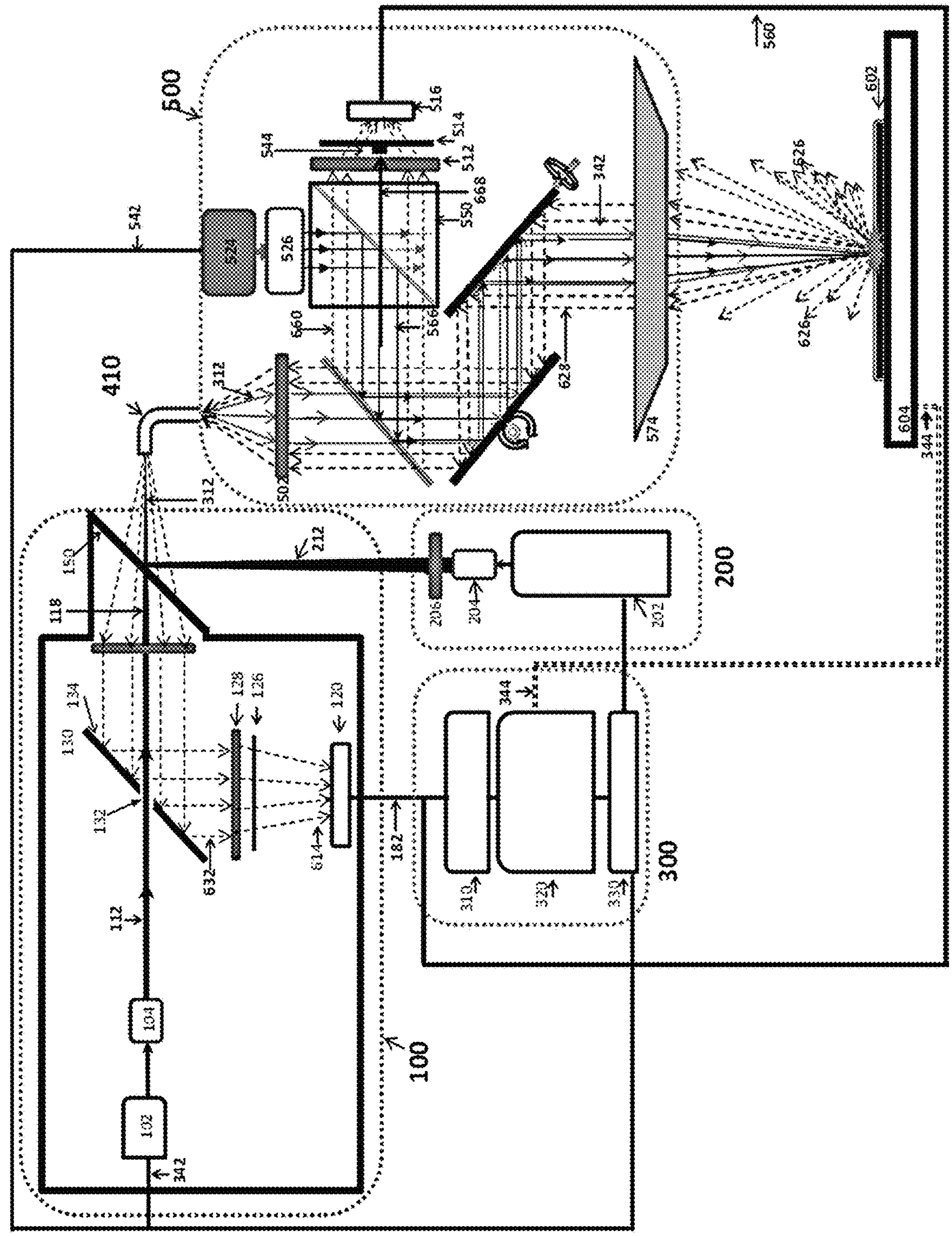
FIG. 24B shows for illustrative purposes only an example of the OSI comprises additional probe laser-B source of one embodiment.

FIG. 24B shows for illustrative purposes only an example of the OSI comprises a probe laser 102 source of one embodiment. FIG. 24B shows wherein the COA comprises additional probe laser source 524 and Photo-detector 516, as described in FIG. 6 of one embodiment.

Figure 25:
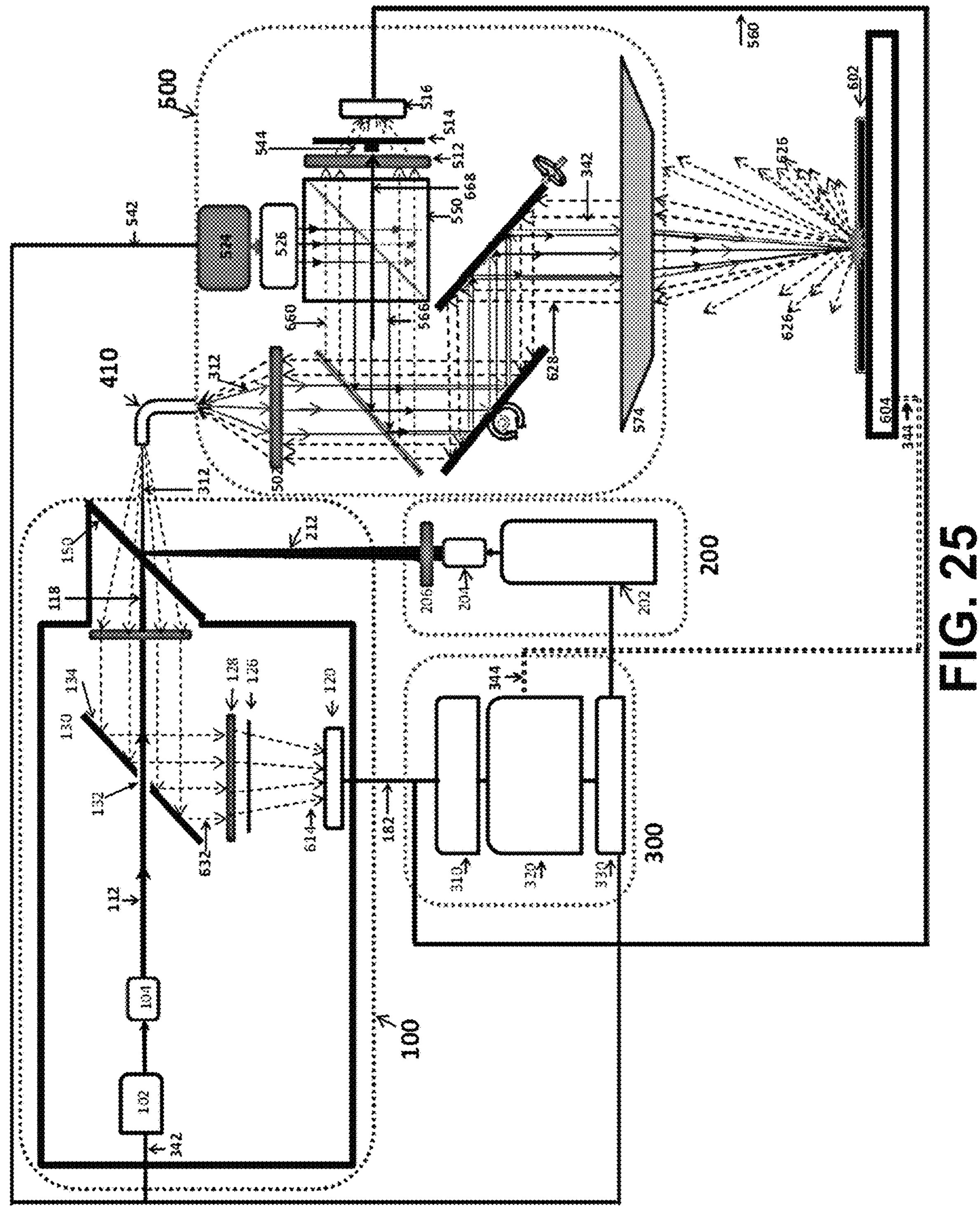
FIG. 25 shows for illustrative purposes only an example of the COA comprises beam scanning mechanism of one embodiment.

FIG. 25 shows for illustrative purposes only an example of the COA comprises beam scanning mechanism of one embodiment. FIG. 25 shows the COA comprising a beam scanning mechanism as described in FIG. 15A of one embodiment.

Figure 26:
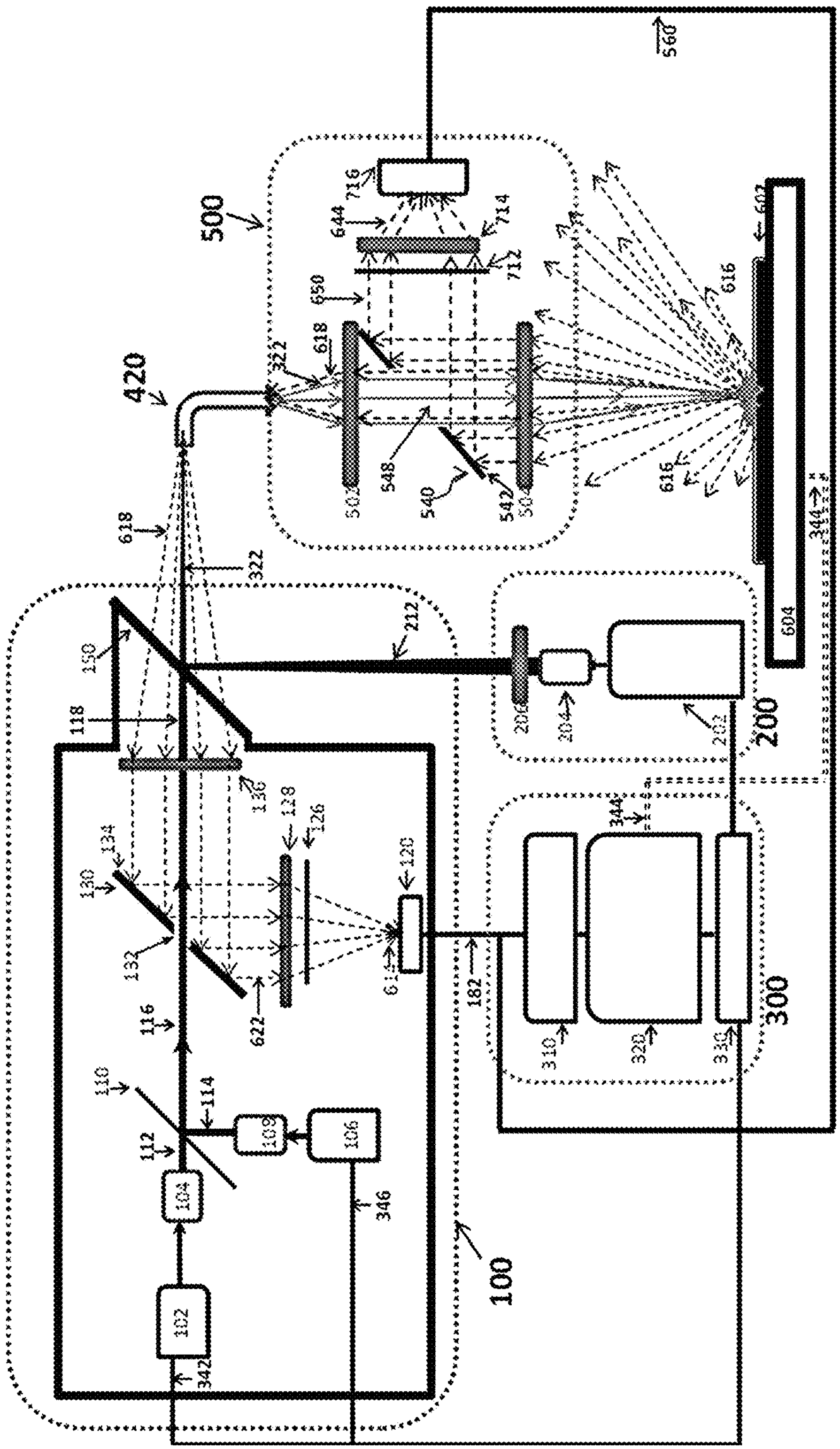
FIG. 26 shows for illustrative purposes only an example of a COA first mirror of one embodiment.

FIG. 26 shows for illustrative purposes only an example of a COA first mirror of one embodiment. FIG. 26 shows the COA comprises mirror 540, instead of the dichroic mirror 520, comprising appropriately large enough pass-thru opening to allow light beams emerging from the fiber optic pass through the mirror and focus onto the target surface of one embodiment.

Figure 27:
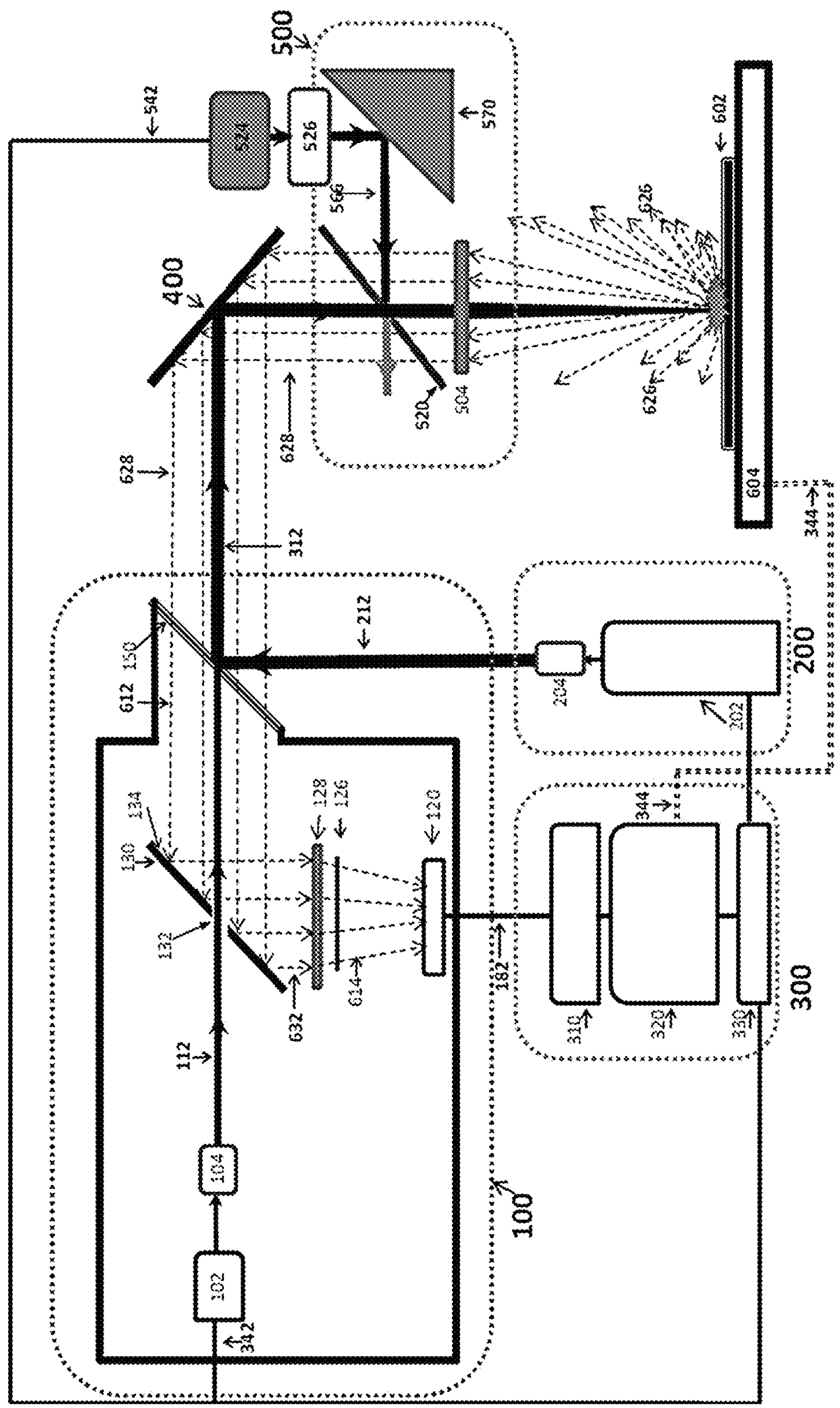
FIG. 27 shows for illustrative purposes only an example of a COA second mirror of one embodiment.

FIG. 27 shows for illustrative purposes only an example of a COA second mirror of one embodiment. FIG. 27 shows a COA without mirror 524 and cube beam splitter 550. Further, the COA comprises mirror 570 (instead of the cube beam splitter 550). In this configuration, the apparatus comprises detection assembly in the OSI while probe illumination beam sources are deployed inside the OSI and the COA. The probe illumination laser beam (diameter-adjusted) 566 (emitted by probe laser source 524 deployed in the COA) is combined with process and probe laser beams emerging from the OSI of one embodiment.

Figure 28:
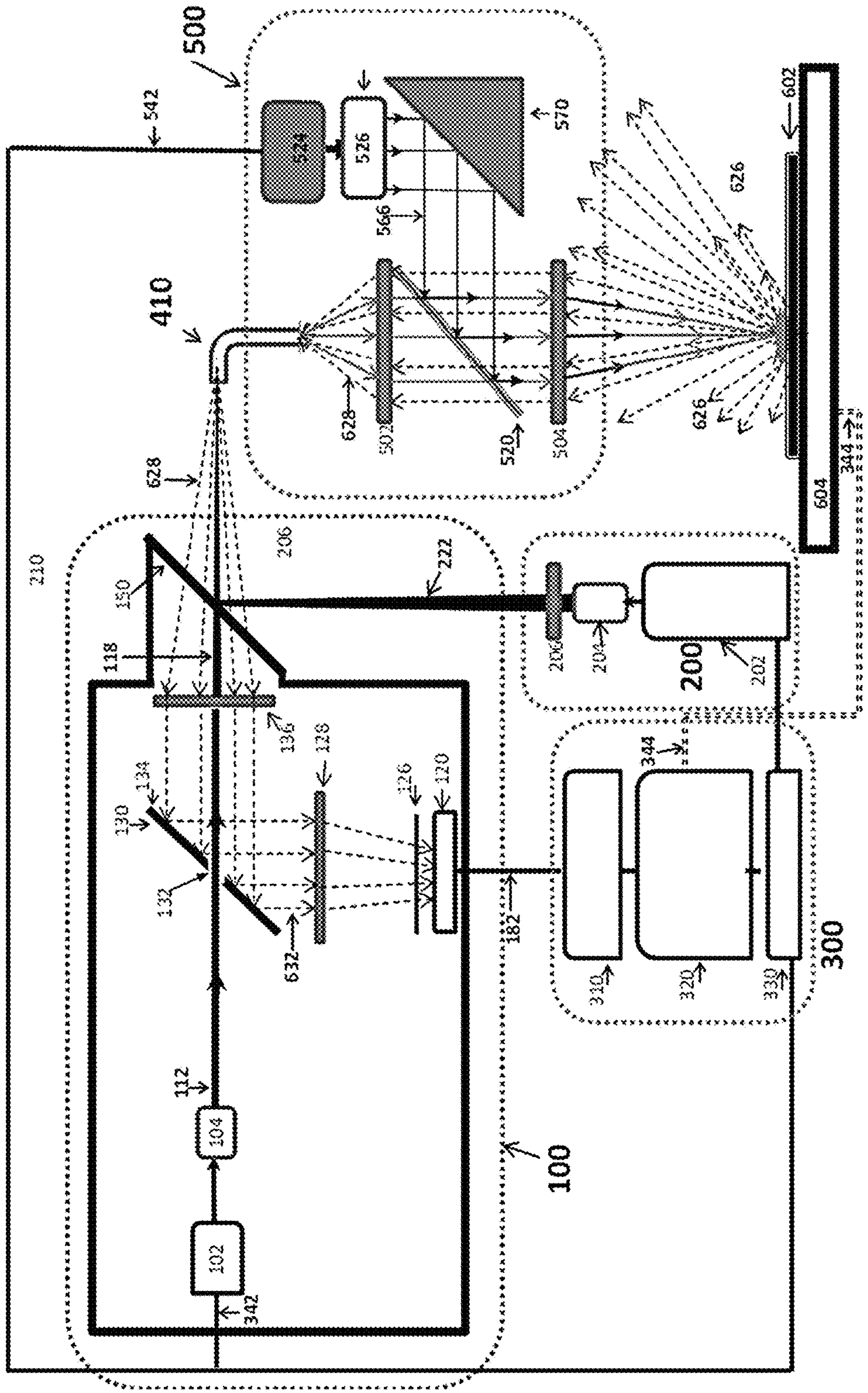
FIG. 28 shows for illustrative purposes only an example of a probe illumination beam of one embodiment.

FIG. 28 shows for illustrative purposes only an example of a probe illumination beam of one embodiment. FIG. 28 shows a probe illumination beam and process laser beams emerging from the OSI are transported to the COA via fiber optic medium 410 of one embodiment.

Figure 29:
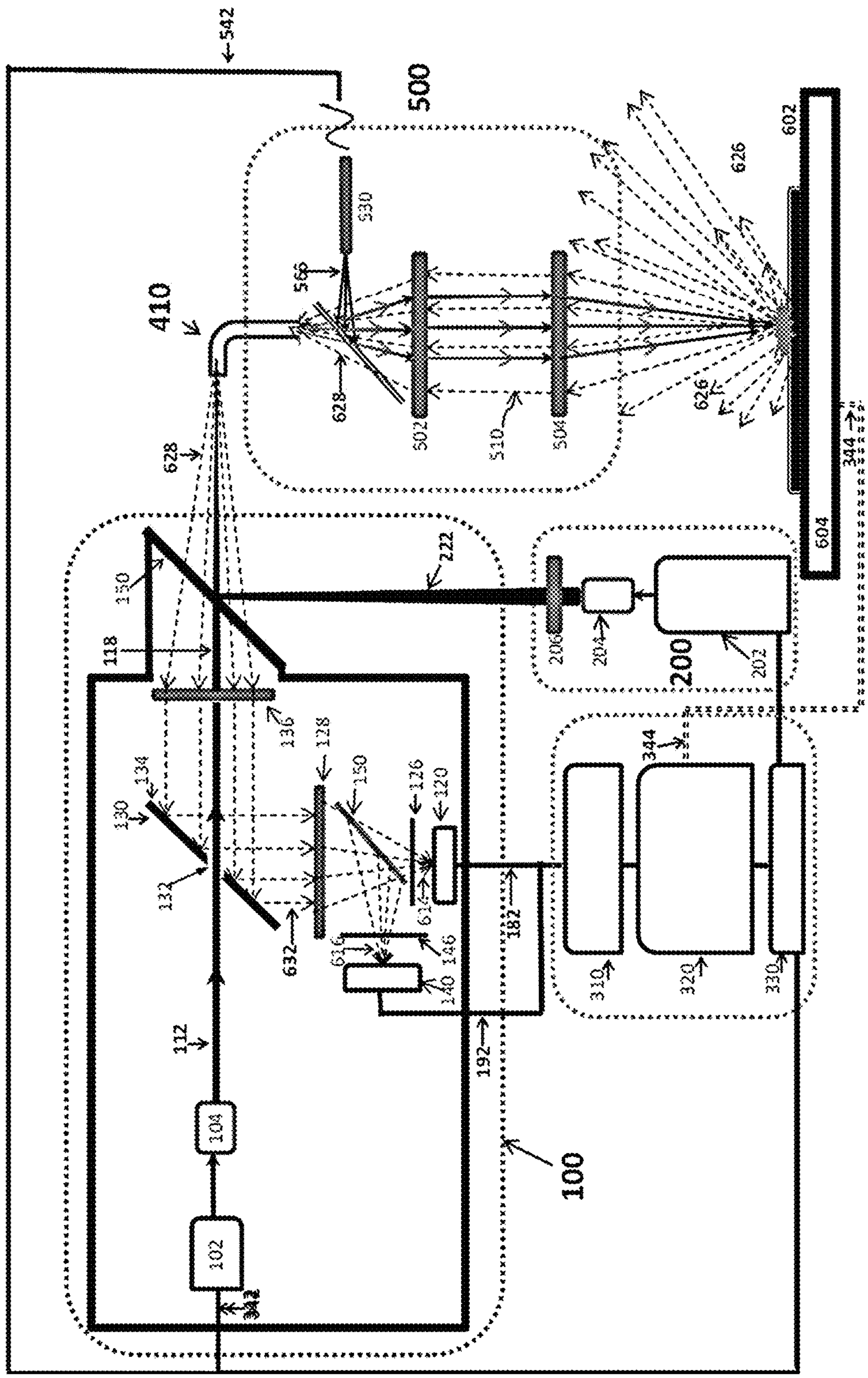
FIG. 29 shows for illustrative purposes only an example of a probe illumination beam delivered into the COA of one embodiment.

FIG. 29 shows for illustrative purposes only an example of a probe illumination beam delivered into the COA of one embodiment. FIG. 29 shows the probe illumination beam 566 is delivered into the COA via a fiber optic medium 530, and is combined with beams emerging from the fiber optic medium 410 before the collimation lens 502. Further, in this configuration, the apparatus comprises a second detector 140 deployed in the OSI. Alternatively, the probe illumination beam 566 is appropriately collimated and combined with the beams emerging from the fiber optic medium 410 after the collimation lens 502.

The fiber optic comprises an output end of non-circular shape, e.g., square shape, whereby the focused image of the fiber optic output end, formed by collimating and focusing lenses on the target surface, is of square shape; or output end of rectangular shape of a desired aspect ratio, whereby the focused image of the fiber optic output end, formed by collimating and focusing lenses on the target surface, is a rectangular spot of the same aspect ratio.

The apparatus probe illumination beam in the COA is combined and collinear with the process laser at the exit-end of said fiber optic, wherein the beams are combined either before the collimation lens 502, deployed in the COA, or after the collimation lens.

The combined process and probe laser beam(s) are transported via a fiber optic medium to the Control Optics Assembly, wherein, said fiber optic medium is either a single-mode fiber optic, or a multi-mode fiber optic, and the COA further comprises collimating optics to collimate, or reduce the divergence of the light beams emerging from the output end of said fiber and focusing the lens to focus the beam on the target of one embodiment.

Figure 30:
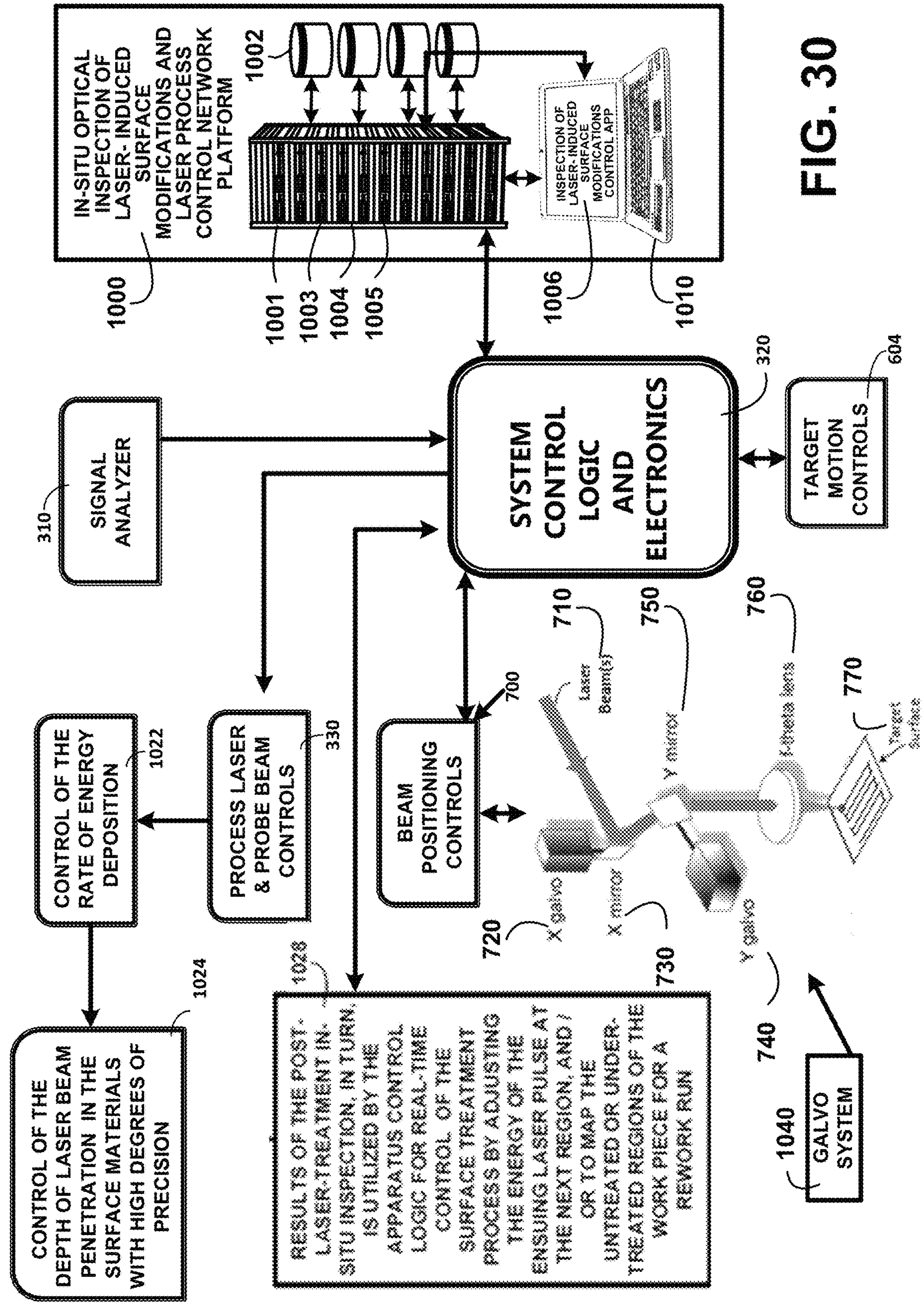
FIG. 30 shows for illustrative purposes only an example of a control network platform of one embodiment.

Control Logic Laser Controls:

FIG. 30 shows for illustrative purposes only an example of a control network platform of one embodiment. FIG. 30 shows an in-situ optical inspection of laser-induced surface modifications and laser process control network platform 1000. The network platform is providing a plurality of databases 1002 for recording inspection and modification data. At least one digital server 1001 operates at least one WI-FI internet communication device 1004 and at least one cellular communication device 1005 for remotely communicating with the embodiments of the in-situ optical inspection of laser-induced surface modifications and laser process integrated apparatuses. The network platform includes an inspection of laser-induced surface modifications control app 1006 installed on a network computer 1010. FIG. 30 shows for example a galvo system 1040.

The system control logic and electronics 320 transmits generated data from in-situ optical inspection of laser-induced surface modifications to control network platform 1000 using at least one WI-FI internet communication device 1004. The system control logic and electronics 320 using at least one cellular communication device 1005 is transmitting and receiving data to and from a user digital device.

The inspection and modification data is transmitted from the control logic is recorded on the plurality of databases 1002. The at least one digital server 1001 passes the inspection and modification data to the at least one digital processor 1003 for performing an analysis of the data. The at least one digital server 1001 transmits the analysis performed by the at least one digital processor 1003 of the inspection and modification data to the system control logic and electronics 320. The at least one digital processor analysis of the inspection and modification data All Photo-detectors (photo-sensors), e.g., 120, 140, 716 send current electrical signal (i.e., Probe Signal) to Signal Analyzer 310. Signal Analyzer 310 measures the electrical signal (i.e., Probe Signal) and determines the Light Intensity. It then communicates to System Control Logic and Electronics 320. Beam Positioning Control 1042 sends Position Data to System Control Logic and Electronics 320. Target Motion Control 604 send Position Data System Control Logic and Electronics 320. System Control Logic and Electronics 320 communicates all available Position Data and Probe Signals values to with in-situ optical inspection of laser-induced surface modifications and laser process control network platform 1000. In-situ optical inspection of laser-induced surface modifications and laser process control network platform 1000 sends decisions on process Laser Power (e.g., laser pulse intensity, or other laser vital parameters), Positions, and Timing, etc. to the System Control Logic and Electronics 320.

The apparatus further comprises utilizing photo detectors signals to construct an image of the target surface prior to any modifications. The constructed image is recorded in the plurality of databases 1002 as an unmodified or a reference surface. The inspection process of the target surface area, region by region, for determined positions of interest on the surface; and constructing an image of the surface pixel by pixel whereby each pixel represents a region on the surface, each pixel value corresponding to the value of the collected probe light at a region with defined position, whereby the constructed image can be used to guide laser pulse intensity adjustment for each region where the modification is desired, or in a 2nd laser processing run to treat and modify the regions where the modification is needed.

A System Control Unit is used to control lasers and probe illumination light operation; electronics; positioning workpiece; receiving, analyzing, and transmitting digital and analog signals and information for controlling and monitoring apparatus operation, controlling and tracking the position of probe and process laser beams on a target surface, controlling probe beam(s) illumination and/or pulsing, analyzing probe beam signals, constructing digital image of target surface, wherein the an image pixels corresponds to the collected light at each determined position.

Processing the target surface region by region for determined positions on the surface; and constructing an image of the surface pixel by pixel, whereby each pixel represents a region on the surface, the pixels corresponding to the value of collected light at each determined position, whereby the constructed image can be used to guide laser pulse intensity adjustment for each region in a 2nd laser processing to treat and modify the regions where the intended surface modification had not been completed in the first surface processing run.

Temporally separated from the process laser pulse and executed before a process laser pulse impinges the region to perform in-situ pre-laser-modification inspection of the region, and the method further comprising in-situ adjusting or muting the laser pulse intensity of the ensuing pulse based on analyzing collected probe beam power to avoid delivery of laser energy at the regions where surface modification is not needed and exposing the region to laser radiation may cause harmful effects to the workpiece surface and temporally overlapped, or partially overlapped, with the process laser pulse impinging the region of one embodiment.

In one embodiment the process laser and probe illumination light beams on the target surface are moved in discrete step-and-expose sequence scheme region by region, wherein a region overlaps the previous region(s) and/or the subsequent region(s). The probe illumination light is provided continuously at a target surface, whereby sampling and measurement of back-scattered signal reflected from a region, arriving at said Photo-detector, can be executed at an arbitrary time with respect to a process laser pulse impinging the region.

The probe illumination light is provided as pulses of illuminating light at a target surface, whereby the pulse illumination timing at a region under interrogation, sampling and measuring of the collected back-scattered light reflected from the illuminated area is appropriately synchronized with respect to the start and/or the completion of a process laser pulse. Laser pulses are directed onto a target surface to modify the surface by ablating and removing a surface coating layer(s), to expose an under-layer coating or the target surface substrate for rework, further wherein said layer comprises organic coating materials; or inorganic coating materials; or paint materials; or ceramic materials; or primer materials. The laser pulses are directed onto a target surface to modify the surface to produce surface micro or nano bumps, or surface micro or nano structures, to modify surface roughness, friction, surface optical reflectivity, surface optical characteristics, to ablate surface material to produce surface structure for modifying surface optical and mechanical characteristics, surface patterning, surface structuring, to clean surface contaminants and stain, dust, rust, mold residues, and oil, to enhance the surface hardness, or to alter surface color, and/or surface reflectivity behavior.

The back-scattered probe signal comprises single or two photon fluorescence signal, Raman signal generated from a sample, or laser induced plasma emission. The Optical Surface Inspection, OSI, assembly includes the Optical Reflector Component and comprises a reflective slab-shape flat mirror comprising at least one reflective surface and one surface through-hole opening; or a through-hole opening, and has different non-slab geometrical shape, e.g., prism shape, wherein said reflective surface is a concave, or a parabolic surface, that reflects and converges the back-scattered light reflected from the region, or a flat surface; or a convex surface; and further the reflective surface is oval shape, or circular shape, square shape, or rectangular shape. A polarizing beam-splitting cube, or a polarizing beam-splitting slab, to split probe light beam(s), both the outgoing source probe beams and incoming back-scattered probe light beam(s) reflected from the target surface; or is a non-polarizing beam-splitting cube, or a non-polarizing beam-splitting slab, to split probe light beam(s), both the outgoing source probe beams and the incoming back-scattered probe light beam(s) reflected from the target surface into two orthogonally polarized beams.

The Optical Surface Inspection, OSI, assembly wherein the probe illumination light source comprises a laser source, wherein the laser source emits polarized laser light; or non-polarized laser light; or non-polarized laser light that is converted to polarized light and a LED source, wherein the LED light source emits near monochromatic radiation; or continuous spectra; or band spectra; or white light source of continuous or band spectra; or plurality of the light sources. The OSI further comprises a second probe illumination source, wherein the second probe beam is a laser beam whose wavelength differs from the first laser probe beam and is combined and collinear with the first probe beam, or it is LED light beam (near monochromatic, or wide spectrum light), or other wide-spectrum light beam, e.g., white light; and, or a second Photo-detector assembly. The COA further comprises a probe illumination source deployed in the COA, wherein the said probe beam is a laser, or LED light beam (single color, or narrow-spectrum, or wide-spectrum), or wide-spectrum light beam, e.g., white light; and, or Photo-detector assembly.

The Control Optics Assembly, COA, and the target surface plane are appropriately oriented such that incident angle of the process and laser beams emerging from the COA, and impinging the target surface, deviates from normal to the target surface to minimize or eliminate undesirable specularly reflected light off the surface, travelling along said common optics path, in the collected probe light and allow back-scattered probe light to reach said Photo-detectors. The apparatus further comprises a light blocking component appropriately positioned in front of a Photo-detector to minimize or eliminate undesirable light specularly-reflected off the surface, travelling along the common optics path, in the collected probe light and allows back-scattered light to reach the Photo-detectors.

In another embodiment the apparatus further comprise additional auxiliary Photo-detector sub-assemblies attached to the COA and appropriately deployed between the COA and the target surface, wherein said Photo-detectors sub-assemblies comprise multiple one-dimensional linear arrays of Photo-detectors, wherein they are attached to the COA, and deployed and oriented symmetrically with respect to central axis of the focusing lens.

The apparatus includes a one-axis line beam scanning mechanism, e.g., a galvo mirror or polygon mirror, or dual-axis XY beam scanning, e.g., XY galvo mirror system, or XY spinning polygon mirror, or a single-axis galvo mirror combined with a single-axis polygon mirror to scan the focus over a target area; or three-axis XYZ beam scanning; or a combination of spinning rotary beam scanning combined with linear translation of said COA, or linear translation of a target surface to provide two-dimensional scanning of the beam over a target area. The apparatus further comprises additional auxiliary Photo-detector sub-assemblies attached to the COA and appropriately deployed between the COA and the target surface, wherein the Photo-detectors sub-assemblies comprise at least one single small-area Photo-detector, or one-dimensional linear array of Photo-detectors appropriately positioned to collect back-scattered probe light reflected off the target surface, but not collected by COA focusing optics; or multiple small-area photo-sensitive detectors are deployed and oriented symmetrically with respect to the central axis of the focusing lens; or multiple linear array of Photo-detectors, wherein they are attached to the COA, and deployed and oriented symmetrically with respect to the central axis of the focusing lens.

Multiple small-area Photo-detectors are deployed and oriented symmetrically with respect to central axis of the focusing lens, or at least one single small-area Photo-detector, or one-dimensional linear array of Photo-detectors appropriately positioned to collect back-scattered probe light reflected off the target surface, but not collected by COA focusing optics. The apparatus is configured with at least one device for transmitting high speed digital information for the apparatus and sub-systems operations of one embodiment.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A method for in-situ inspection of an object, comprising:

providing a pulsed laser source during the in-situ inspection of a surface of the object for modifying at least one of an optical, mechanical, or chemical property of a first region of the surface;

directing a process laser source through an optics path to shape, position and focus a pulsed laser beam at the first region;

directing a probe illumination light beam to the optics path to produce a combined and collinear optical light path of the probe illumination light beam and the pulsed laser beam to focus and deliver the combined and collinear optical light path at a same region on the surface;

substantially superimposing a first focus spot of the probe illumination light beam over a second focus spot of the pulsed laser beam on an illuminated region of the surface;

collecting back-scattered probe light reflected off the illuminated region and directing the collected light from the illuminated region through at least a portion the combined and collinear optical light path to provide a bi-directional common optic path for the pulsed laser beam, probe illumination light beam, and the collected back-scattered probe light from the illuminated region;

continually assessing modifications to each target region and controlling predetermined modifications to the next region by automatically adjusting laser pulse intensities of the laser beam; and constructing an image of the surface with at least one pixel and at least one pixel value, wherein each pixel represents a region on the surface and each pixel value represents a value of collected probe light at a region of a defined position, wherein the constructed image is used to adjust the laser pulse intensities for predetermined modifications to other regions.

2. The method for in-situ inspection of an object of claim 1, wherein the laser pulses are directed onto a target surface to modify the surface.

3. The method for in-situ inspection of an object of claim 1, further comprising extracting and evacuating by-product waste of laser surface modification process, e.g., particles, contaminants, paint dust, and gases produced in laser surface cleaning and laser surface paint and coating removal.

4. The method for in-situ inspection of an object of claim 1, wherein laser pulses are directed onto a target surface to modify the surface by surface texturing, surface patterning, and surface structuring.

5. The method for in-situ inspection of an object of claim 1, further comprising fiber optic as a deliver means for probe and process beams.

6. The method for in-situ inspection of an object of claim 1, further comprising transmitting high speed digital information for the apparatus and sub-systems operations.

7. The method for in-situ inspection of an object of claim 1, wherein the process laser power is muted or removed whereby utilizing the method for inspecting and analyzing a surface for specific conditions.

8. The method for in-situ inspection of an object of claim 1, wherein the back-scattered probe signal comprises single or two photon fluorescence signal, Raman signal generated from a sample, or laser induced plasma emission.

9. The method for in-situ inspection of an object of claim 1, wherein the process laser and probe illumination light beams on the target surface are moved.

10. An apparatus for in-situ processing and inspection of an object, comprising:

a pulsed laser source configured to modify at least one of an optical, mechanical, or chemical property of a first region of a surface of the object during the in-situ surface inspection of the object;

a laser source configured to be directed through an optics path to shape, position and focus a pulsed laser beam at the first region;

a probe illumination light beam configured to be directed to the optics path for producing a combined and collinear optical light path comprised of the pulsed laser beam and the probe illumination light beam, wherein the combined and collinear optical light path are focused and delivered at a same region on the surface;

wherein a first focus spot of the probe illumination light beam is substantially superimposed over a second focus spot of the pulsed laser beam on an illuminated region of the surface and wherein back-scattered probe light reflected off the illuminated region is collected and directed through at least a portion the combined and collinear optical light path to provide a bi-directional common optic path for the pulsed laser beam, probe illumination light beam, and the collected back-scattered probe light from the illuminated region;

an analyzer device configured to continually assess and analyze modifications to the first region and control predetermined modifications to each target region by automatically adjusting laser pulse intensities of the laser beam continually assessing modifications to each target region and controlling predetermined modifications to the next region by automatically adjusting laser pulse intensities of the laser beam; and an imaging device configured to construct an image of the surface with at least one pixel and at least one pixel value, wherein each pixel represents a region on the surface and each pixel value represents a value of collected probe light at a region of a defined position and wherein the constructed image is used to adjust the laser pulse intensities for predetermined modifications to other regions.

11. An apparatus for in-situ processing and inspection of an object of claim 10, further comprising a probe illumination light source including a laser source, wherein the laser source emits polarized laser light, or non-polarized laser light, or non-polarized laser light that is converted to polarized light.

12. An apparatus for in-situ processing and inspection of an object of claim 10, further comprising a probe beam consisting of a laser, or LED light beam (single color, or narrow-spectrum, or wide-spectrum), or wide-spectrum light beam, e.g., white light; and, or Photo-detector assembly.

13. An apparatus for in-situ processing and inspection of an object of claim 10, further comprising a light blocking component appropriately positioned in front of a Photo-detector to minimize or eliminate undesirable light specularly-reflected off the surface.

14. An apparatus for in-situ processing and inspection of an object of claim 10, further comprising at least one beam shaping and focusing optics to shape and focus said process laser and probe beams to focal spots of desired shape and sizes on the target surface.

15. An apparatus for in-situ processing and inspection of an object of claim 10, further comprising additional auxiliary Photo-detector sub-assemblies coupled to the COA and appropriately deployed between the COA and the target surface.

16. An apparatus for in-situ inspection of an object, comprising:

a pulsed laser source;

a dichroic mirror configured to receive light from the pulsed laser source;

a probe illumination beam configured to be combined with the pulsed laser source with the dichroic mirror to form a collinear optical light path to focus and deliver the optical light path at a same region on the surface;

a photo-detector sub-assembly configured to sample and measure collected back-scattered light reflected from the region, an optical reflector having a thru-hole opening and configured to collect back-scattered light from the probe illumination beam, wherein a portion of the collected back-scattered light reflected off a region on the target surface is separated, transported back to an optical surface inspection device and a portion is reflected and directed toward the photo-detector sub-assembly;

a control optics assembly having an optical device configured to shape, focus, and superimpose focal spots of the probe illumination beam onto the region of the target surface;

a positioning motion stage assembly configured to control, position and track a position of the probe illumination beam on the target surface;

a system control unit configured to control, monitor and track a position of the probe illumination beam on the target surface and control the probe illumination beam; and an imaging device configured to construct an image of the surface with at least one pixel and at least one pixel value, wherein each pixel represents a region on the surface and each pixel value represents a value of collected probe light at a region of a defined position and wherein the constructed image is used to adjust the laser pulse intensities for predetermined modifications to other regions.

17. An apparatus for in-situ inspection of an object of claim 16, further comprising the COA comprises beam scanning mechanism and focusing optics to illuminate a target surface region by region by scanning the superimposed focal spots of the probe and process beams on the target surface area.

18. An apparatus for in-situ inspection of an object of claim 16, further comprising the System Control Unit and said beam scanning mechanism comprising a one-axis line beam scanning mechanism including a galvo mirror or polygon mirror.

19. An apparatus for in-situ inspection of an object of claim 16, further comprising a probe illumination beam coupled to the COA combined and collinear with the process laser at the exit-end of a fiber optic.

20. An apparatus for in-situ inspection of an object of claim 16, further comprising a fiber optic comprising an output end of square shape.

* * * * *